(12) United States Patent
Dutta

(10) Patent No.: US 11,362,954 B2
(45) Date of Patent: Jun. 14, 2022

(54) TUNNELING INTER-DOMAIN STATELESS INTERNET PROTOCOL MULTICAST PACKETS

(71) Applicant: Nokia Solutions and Networks Oy, Espoo (FI)

(72) Inventor: Pranjal Kumar Dutta, Sunnyvale, CA (US)

(73) Assignee: Nokia Solutions and Networks Oy, Espoo (FI)

( * ) Notice: Subject to any disclaimer, the term of this patent is extended or adjusted under 35 U.S.C. 154(b) by 137 days.

(21) Appl. No.: 16/366,177

(22) Filed: Mar. 27, 2019

(65) Prior Publication Data
US 2020/0314016 A1 Oct. 1, 2020

(51) Int. Cl.
*H04L 47/10* (2022.01)
*H04L 12/46* (2006.01)
(Continued)

(52) U.S. Cl.
CPC .......... *H04L 47/15* (2013.01); *H04L 12/4633* (2013.01); *H04L 12/66* (2013.01);
(Continued)

(58) Field of Classification Search
CPC . H04L 12/1854; H04L 12/4633; H04L 12/66; H04L 45/16; H04L 45/50;
(Continued)

(56) References Cited

U.S. PATENT DOCUMENTS 5,361,256 A * 11/1994 Doeringer ........... H04L 12/1836
370/390
10,616,063 B1 * 4/2020 Dutta .................... H04L 65/607
(Continued)

FOREIGN PATENT DOCUMENTS

WO 03047166 A1 6/2003

OTHER PUBLICATIONS

Extended European Search Report dated Aug. 20, 2020 for European Application No. 20165993.5, 8 pages.
(Continued)

*Primary Examiner* — Khaled M Kassim
(74) *Attorney, Agent, or Firm* — Tong, Rea, Bentley & Kim, LLC

(57) ABSTRACT

A router is configured for deployment in a first domain of a network. The router includes a processor and a transmitter. The processor is configured to access addresses of egress routers for a multicast flow that are partitioned into local addresses of egress routers in the first domain and external addresses of egress routers in a second domain of the network. The processor is also configured to prepend an explicit multicast route (EMR) to a packet in the multicast flow to form a first EMR packet. The EMR includes information representing the external addresses. The transmitter is configured to unicast the first EMR packet to an advertising border router (ABR) that conveys the multicast flow from the first domain to the second domain. In some cases, the router includes a receiver configured to receive another EMR packet from another router in another domain via a tunnel between the routers.

24 Claims, 15 Drawing Sheets

(51) Int. Cl.
  *H04L 12/66*    (2006.01)
  *H04L 45/16*    (2022.01)
  *H04L 45/50*    (2022.01)
  *H04L 45/741*   (2022.01)
  *H04L 47/70*    (2022.01)
  *H04L 67/142*   (2022.01)
  *H04L 69/164*   (2022.01)
  *H04L 69/22*    (2022.01)

(52) U.S. Cl.
  CPC .............. *H04L 45/16* (2013.01); *H04L 45/50* (2013.01); *H04L 45/741* (2013.01); *H04L 47/825* (2013.01); *H04L 67/142* (2013.01); *H04L 69/164* (2013.01); *H04L 69/22* (2013.01)

(58) Field of Classification Search
  CPC ..... H04L 45/741; H04L 47/15; H04L 47/825; H04L 67/142; H04L 69/164; H04L 69/22
  See application file for complete search history.

(56) References Cited

U.S. PATENT DOCUMENTS

| | | | | |
|---|---|---|---|---|
| 2006/0268871 | A1* | 11/2006 | Van Zijst | H04L 45/123 370/390 |
| 2007/0168523 | A1* | 7/2007 | Jiang | H04L 29/06027 709/228 |
| 2011/0103394 | A1* | 5/2011 | Vogt | H04L 61/2557 370/401 |
| 2016/0254987 | A1 | 9/2016 | Eckert et al. | |
| 2018/0309587 | A1* | 10/2018 | Johnsen | H04L 12/185 |

OTHER PUBLICATIONS

Iu, Ming-Yee, "Explicit Multicasting within a Unicast Infastructure", Eighth International Symposium on Computers and Communications. (ISCC), vol. 1, Jul. 2003, 7 pages.
Romdhani, Imed, et al., "IP Mobile Multicast: Challenges and Solutions", Communications Surveys & Tutorials, vol. 6, Issue 1, First Quarter 2004, 24 pages.
European Office Action mailed in corresponding EP 20 165 993.5 dated Sep. 8, 2021, 5 pages.
Duffy, "Arista takes on Cisco, Juniper at routing; New 'Jericho' switches and FlexRoute software aimed at replacing Internet routers", Network World, Mar. 29, 2016, 6 pages.
"BCM88690 StrataDNX 10 Tb/s Scalable Switching Device", Prodcut Brief, Broadcom, 2 pages.
Ray, "Cisco Already Had a Jump on Arista with Broadcom Routing Chip, Says UBS", Barron's, https://www.barrons.com/articles/cisco-already-had-a-jump-on-arista-with-broadcom-routing-chip-says-ubs-1459795684, Apr. 4, 2016, accessed: Feb. 8, 2019, 2 pages.
Xu et al., "Encapsulating IP in UDP, draft-xu-intarea-ip-in-udp-07", Intarea Working Group, Internet-Draft, Apr. 27, 2018, 11 pages.
Farinacci et al., "Generic Routing Encapsulation (GRE)", RFC 2784, Network Working Group, Mar. 2000, 9 pages.
Cain et al., "Internet Group Management Protocol, Version 3", RFC 3376, Network Working Group, Oct. 2002, 53 pages.
Rosen et al., "Multiprotocol Label Switching Architecture", RFC 3031, Network Working Group, Jan. 2001, 61 pages.
Fenner et al., Protocol Independent Multicast—Sparse Mode (PIM-SIM): Protocol Specification (Revised), RFC 7761, Internet Engineering Task Force (IEIF), Mar. 2016, 137 pages.

* cited by examiner

TUNNELING INTER-DOMAIN STATELESS INTERNET PROTOCOL MULTICAST PACKETS

BACKGROUND

Multicasting is used to transmit a single packet to multiple recipients in a wired or wireless communication network. The Internet Protocol (IP) is used for IP multicasting to a reserved block of multicast addresses, or group addresses, which are defined for IPv4 and IPv6. A single source is therefore able to transmit a single packet including an IPv4 or IPv6 header with a multicast address as the destination address in the header and the packet will be received by all the members of the multicast group associated with the multicast address. This mode of IP multicasting is classified as stateful multicasting. In stateful multicasting, multicast packets are routed through a multicast distribution tree (MDT) that includes an ingress router that receives the multicast packet from a source, one or more transit routers, and one or more egress routers that provides copies of the multicast packet to local area networks or radio access networks for transmission to the members of the multicast group. The egress routers are referred to as leaf nodes and the ingress router is referred to as a root node of the MDT, which is set up by a control protocol. The routers in the MDT are required to maintain control plane and data plane state information that defines routes taken by the multicast packets between the ingress router and the egress routers. Each router therefore maintains state information for each multicast flow that traverses the router. In source-specific stateful IP multicast, a specific source is only allowed to multicast to a multicast group and the tuple {source address, multicast address} constitutes the identifier to a multicast flow or an MDT.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
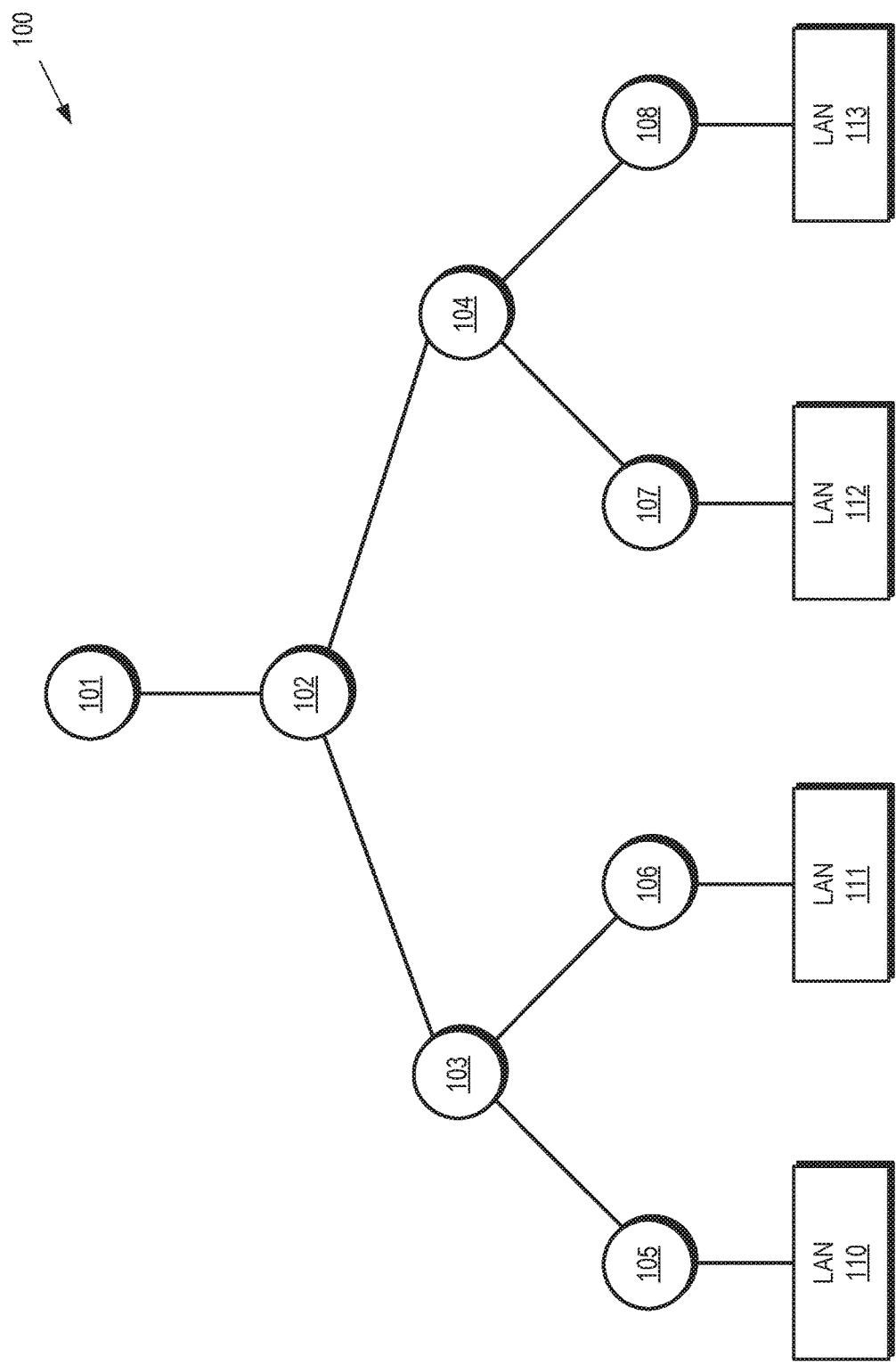
FIG. 1 is a block diagram of a communication system that is configured to perform multicasting of packets according to some embodiments.

Stateless forwarding of multicast data packets does not require a control protocol to define a multicast distribution tree (MDT) for a multicast flow nor does it require transit routers to maintain per-flow state information. One type of stateless architecture leverages previously established unicast IP routes between an ingress router and egress routers in a domain. The ingress router receives a multicast data packet and determines the set of egress routers that provide the data packet to members of the multicast group that is subscribed to the multicast flow. The ingress router then encapsulates the multicast data packet by prepending a header that includes a list of IP addresses that each represent one of the egress routers in the domain. The list of IP addresses is referred to herein as the explicit multicast route (EMR). The EMR-encapsulated packet is forwarded from the ingress router to the egress routers using data plane states that represent the unicast IP routes to the egress routers, e.g., the data plane states represented by routing tables in the ingress, transit, and egress routers. For example, when a router receives an EMR-encapsulated packet, the router performs a routing table lookup to determine the next hop address for each IP address listed in the EMR. A local copy of the packet (without the EMR) is generated if the routing table lookup indicates that the router is the egress router. The remaining IP addresses are partitioned based on the next hop addresses. One copy of the packet is generated for each next hop and an EMR is generated for each copy based on the IP addresses associated with the corresponding next hop. The EMR-encapsulated packets are then multicast to the next hop routers. A copy of the packet can be unicast to its egress router if only one IP address is associated with the next hop for the egress router.

Networks are typically partitioned into domains that include sets of ingress, transit, or egress routers. Such domains could be areas in open shortest path first (OSPF) routing protocol, levels in intermediate system to intermediate system (IS-IS) routing protocol, autonomous system (AS) in the border gateway protocol (BGP) routing protocol or the likes. The domains also include border routers that are configured to convey packets between the domains. The border routers are referred to as area border routers (ABR) in domains that operate according to the open shortest path first (OSPF) routing protocol and the intermediate system to intermediate system (IS-IS) routing protocol. The border routers are referred to as autonomous system border routers (ASB R) in domains that operate according to the border gateway protocol (BGP) routing protocol. Stateless IP multicasting is used to forward the EMR-encapsulated packets to egress routers in the different domains via one or more border routers. However, every IP address listed in the EMR needs to be looked up in the routing table maintained by every router that receives the EMR-encapsulated packet. The number of routing table lookup therefore increases linearly with the number of IP addresses in the EMR, which scales with the number of egress routers. The resulting order-N, O(N), lookup process (where N is the number of egress routers) is inefficient, particularly in networks that include a large number of egress routers. The O(N) lookup process also increases the latency of the EMR packets since each forwarding router has to perform O(N) lookups.

FIGS. 1-18 disclose techniques for performing stateless forwarding of IP multicast data packets that are transmitted between domains of a network with an O(1) lookup process by leveraging previously established unicast routes represented by routing tables that are stored by routers in the network. A modified routing table stored in routers in a first domain includes information indicating a plurality of addresses of a plurality of egress routers for a multicast flow, next hops for the plurality of addresses, and indications of whether the plurality of egress routers are internal or external to the first domain. The modified routing table also includes information indicating advertising border routers (ABRs) of the plurality of egress routers. Addresses in subsets of the plurality of addresses that are associated with egress routers that are external to the first domain are associated with the same ABRs. For example, all the addresses of egress routers in a second domain that is connected to the first domain by an ABR are associated with the address of the ABR that connects the first and second domains. This association is made by the respective protocol such as OSPF, IS-IS or BGP at the ABR while distributing the addresses of egress routers in the second domain to the first domain. The ABRs for the subsets convey multicast packets from the first domain to the external networks that include the egress routers indicated by the corresponding subsets of the plurality of addresses. The routing table is constructed using address information that is broadcast by routers within the first domain and the ABRs for the external domains. The address information is rebroadcast (or flooded) by routers in the network in response to changes in the topology of the network.

In operation, a first router, such as an ingress router for a domain or an ABR for the domain, partitions the addresses of egress routers listed in a routing table into local addresses of egress routers in the same domain as the first router and external addresses of egress routers in different domains. The first router applies different forwarding techniques for the local addresses and the external addresses in the list of egress routers for the stateless IP multicast packet. For each local address, the first router performs a lookup of the routing table to determine the next hop address for the local address. One copy of the packet is generated for each next hop and the first router generates an explicit multicast route (EMR) for each copy that includes addresses of the local egress routers that share the same next hop. The copies of the packets are encapsulated with the EMR and the EMR-encapsulated packets are multicast to the next hop routers. For the external addresses, the first router generates a copy of the packet for each ABR and an EMR that includes the addresses of the routers associated with the ABR. The copies of the packets are encapsulated with the EMR and the EMR-encapsulated packets are unicast to the ABRs, e.g., by tunneling the EMR-encapsulated packet to the ABR using previously determined unicast routing information. A local copy of the packet is generated if the routing table lookup indicates that the first router is an egress router for the multicast flow.

Selectively multicasting packets to local egress routers and unicasting packets to ABRs reduces the number of routing table lookups required to multicast packets to egress routers, which reduces the overall latency of inter-domain EMR packets. For example, intermediate hops only perform O(1) lookup to forward a unicast packet along a tunnel used to unicast an EMR-encapsulated packet from an ingress router to an ABR or a tunnel used to unicast the EMR-encapsulated packet between ABRs. For example, if an inter-domain EMR packet traverses three domains from an ingress router to an egress router, an O(N) lookup is performed only at the ingress router to the first domain, an advertising border router that connects the first domain to the second domain, an advertising border router that connects the second domain to the third domain, and any routers in the third domain that forward the EMR packet to the local egress routers. The EMR packet is opaque for the intermediate hops. This selective multicasting also reduces the overall latency of EMR packet to local egress routers because the EMR packet that is sent to local egress routers does not contain the external addresses in the list of egress routers. Removing the external addresses from the list of egress routers in the local EMR packet reduces the number of routing table lookups required to multicast packets to local egress routers and therefore reduces overall latency.

FIG. 1 is a block diagram of a communication system 100 that is configured to perform multicasting of packets according to some embodiments. The communication system 100 includes routers 101, 102, 103, 104, 105, 106, 107, 108, which are collectively referred to herein as "the routers 101-108." The routers 101-108 are able to receive multicast packets and forward the multicast packets towards one or more local access networks (LAN) 110, 111, 112, 113, which are collectively referred to herein as "the LAN 110-113."

Some embodiments of the communication system 100 implement stateful multicasting of packets. As used herein, the term "stateful" refers to a technique of multicasting that requires defining specific states for MDT for each multicast flow in both the control plane and data plane entities in the routers 101-108. State information stored in control plane and data plane entities of the routers 101-108 is used to define multicast routes, e.g., from an ingress router 101 to one or more of the LAN 110-113. The routers 101-108 are configured to route the multicast packets from the ingress router 101 to one or more of the egress routers 105-108 over MDTs. For example, if egress router 105 receives a request for packets associated with a multicast flow from the corresponding LAN 110, the egress router 105 initiates a join procedure for the MDT for the multicast flow by transmitting join messages towards the transit router 103. Router 105 selects transit router 103 as the upstream router of the MDT for the multicast flow by using reverse path forwarding (RPF), which means that transit router 103 is the next-hop of the unicast route towards ingress router 101, which is in the reverse direction of the multicast packet flow. For example, the egress router 105 can install or modify a routing table for the multicast flow that indicates that the egress router 105 is a local router that routes multicast packets for the multicast flow to the LAN 110. In response to receiving the join message, the transit router 103 installs state information for the MDT for the multicast flow in both the control plane and the data plane that indicates that the egress router 105 is a downstream router for the multicast flow. For example, the transit router 103 can install or modify a routing table for the multicast flow that indicates that multicast packets are routed to the egress router 105. The transit router 103 also sends a join message to the transit router 102 (which is next-hop of the unicast route towards ingress router 101), which installs corresponding state information in the control plane and data plane. For example, the transit router 102 can install or modify a routing table for the multicast flow that indicates that multicast packets are routed to the transit router 103. The transit router 102 also sends a join message to the ingress router 101, which configures corresponding state information for the MDT for the multicast flow such as a routing table that indicates that multicast packets for the flow are routed to the transit router 102. Multicast packets transmitted by the ingress router 101 are distributed to the LAN 110 via the transit routers 102, 103 and the egress router 105 according to the state information (e.g., unicast routing tables) stored in the corresponding routers 101, 102, 103, 105.

Some embodiments of the communication system 100 implement stateless multicasting by leveraging previously established unicast routes represented by routing tables that are stored by routers 101-108 in the network. As used herein, the term "stateless" refers to a paradigm for forwarding multicast packets that does not require a control protocol for explicitly building an MDT for each multicast flow. Furthermore, routers 101-108 in a stateless architecture are not required to maintain any per-flow state, e.g., routers do not include separate state information for MDT for each multicast flow and any state information that is stored in a router in a stateless architecture is used to route multicast packets for multiple multicast flows that are not necessarily directed to the same set of egress routers.

In the illustrated embodiment, the communication system 100 implements stateless multicasting using an explicit multicast route (EMR) that is encoded into the multicast packets. The EMR includes information representing addresses of the egress routers that are subscribed to the multicast flow. The ingress router 101 to the network including the routers 101-108 determines a set of egress routers (such as the egress routers 105, 106) that are to receive multicast packets. The ingress router 101 generates an EMR that includes the addresses of the egress routers 105, 106 and then encapsulates the multicast packet in a header that includes the EMR. The encapsulated packet is referred to as an EMR-encapsulated packet or an EMR packet. In response to receiving an EMR packet, a router performs an IP route table lookup (based on the previously established unicast routing table) to determine the next hop for each of the addresses indicated in the EMR. If an entry in the routing table indicates that the current router is the egress router for the packet, the local address is removed from the EMR and a local copy of the packet is sent to an upper layer in the router. The non-local addresses are partitioned based on their next hops and a copy of the packet (or a copy of the payload of the packet) is generated for each next hop. The router generates a different EMR for each copy so that the EMR for each copy only includes the addresses of the egress routers that are connected to the next hop. The newly generated EMR packets are then multicast to the respective next hop routers. If only one address is associated with the next hop router, the router can send the packet is a standard unicast IP packet using the address as a destination address in an IP header.

In order to multicast packets to subscribing LAN 110, 111, the ingress router 101 generates an EMR that includes addresses of the egress routers 105, 106. A multicast packet is then encapsulated with the EMR to form an EMR packet, which is forwarded from the ingress router 101 to the transit router 102. The shortest path to the egress routers 105, 106 includes the transit router 102 and so the transit router 102 does not need to modify the EMR packet before forwarding to the transit router 103. Upon receipt of the multicast packet, the transit router 103 makes two copies of the multicast packet and forwards the copies to the egress routers 105, 106. The copies can be multicast using corresponding EMR or, in some embodiments, unicast using the addresses of the egress routers 105, 106.

The stateless multicasting technique disclosed above requires that every address listed in the EMR is looked up in the routing table maintained by the routers 101-108 that receive the EMR-encapsulated packet. The number of routing table lookups therefore increases linearly with the number of addresses in the EMR, which scales with the number of egress routers. The resulting O(N) lookup process (where N is the number of egress routers) is inefficient, particularly in networks that include a large number of egress routers. The O(N) lookup process also increases the latency of the EMR packets since each forwarding router has to perform O(N) lookup. The number of routing table lookups and the overall latency of multicasting in the communication system 100 are reduced by subdividing the routers 101-108 into domains that are interconnected by advertising border routers (ABRs). Packets in the multicast flow are then selectively multicast to local egress routers and unicast to ABRs, as discussed below.

Figure 2:
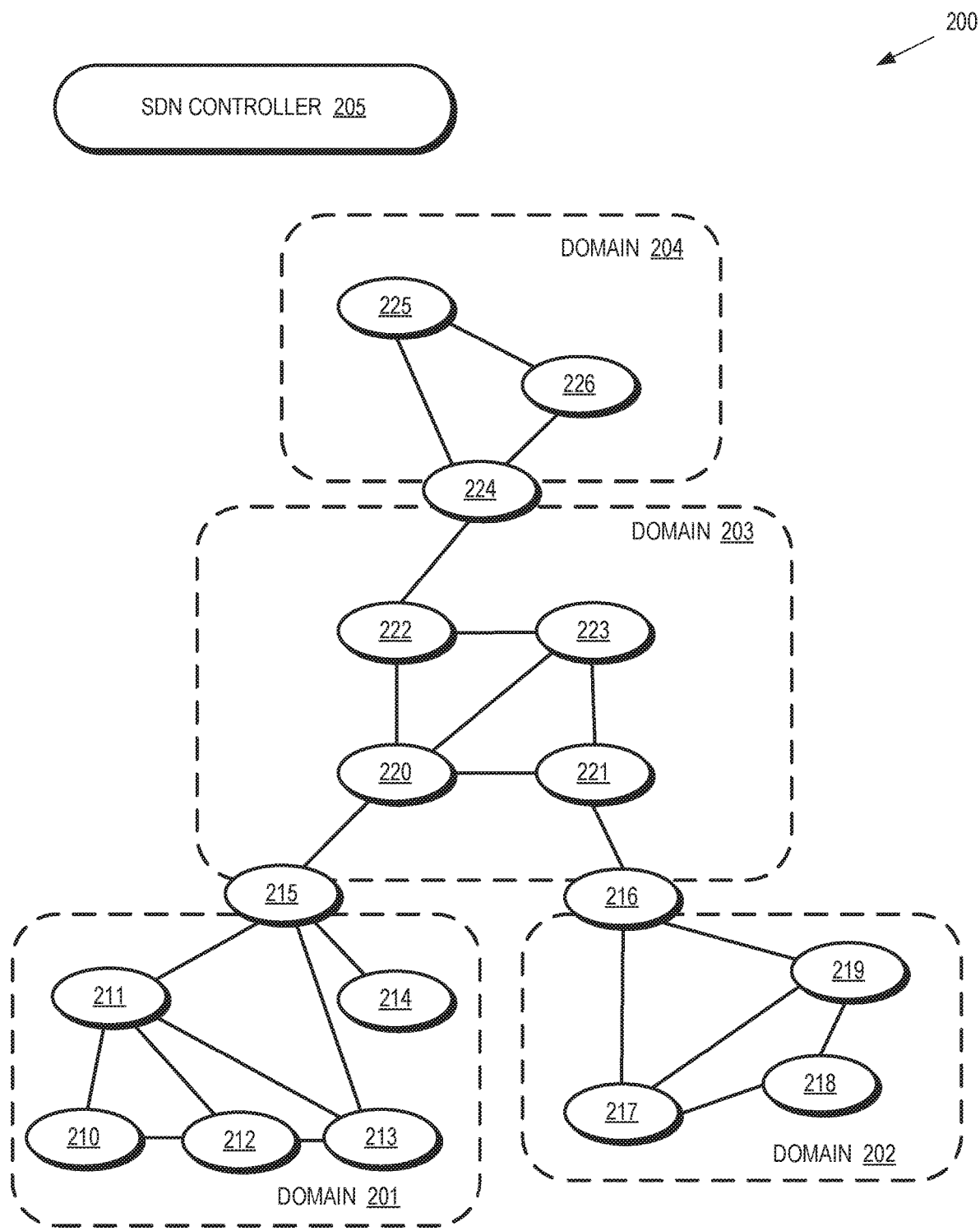
FIG. 2 is a block diagram of a network that is subdivided into domains according to some embodiments.

FIG. 2 is a block diagram of a network 200 that is subdivided into domains 201, 202, 203, 204 according to some embodiments. The network 200 operates according to software defined networking (SDN). Some embodiments of the network 200 include one or more SDN controllers 205 that are used to configure and operate entities in the network 200. The domains 201-204 include subsets of the routers 210, 211, 212, 213, 214, 215, 216, 217, 218, 219, 220, 221, 222, 223, 224, 225, 226 that are collectively referred to herein as "the routers 210-226." For example, the domain 201 includes the routers 210-214. The network 200 also includes ABRs 215, 216, 224 that convey packets between the domains 201-204 using interfaces in the connected pairs of the domains 201-204. For example, the ABR 215 conveys packets between the domain 201 and the domain 203. For another example, the ABR 216 conveys packets between the domain 203 and the domain 202. For yet another example, the ABR 224 conveys packets between the domain 203 and the domain 204. Although a single ABR is used to connect different pairs of the domains 201-204, multiple ABRs are used to connect pairs of the networks 201-204 in some embodiments. In some embodiments, a single ABR is used to connect multiple domains.

The routers 210-226 within the domains 201-204 are identified using Internet protocol (IP) prefixes. In some embodiments, the routers 210-226 within the domains 201-204 are assigned continuous IP subnets so that they can be summarized with summary prefixes. For example, the domain 202 has local networks connected to the routers 217-219 that are identified as IPv4 subnets 12.1.0.0/24, 12.1.1.0/24, 12.1.2.0/24, respectively. The three IPv4 subnets are summarized with a single summary IPv4 prefix 12.1.0.0/22. The routers 210-226 within each of the domains 201-204 maintain identical databases, e.g., link state databases (LSDBs), which define the topology of the corresponding domains 201-204. A topology change within any of the domains 201-204 is "flooded" among the internal routers using link state advertisements. However, the topology of the domains 201-204 is hidden from the other domains by the ABRs 215, 216, 224. The ABRs 215, 216, 224 maintain one topology database per adjacent domain and the ABRs 215, 216, 224 only exchange summary prefixes between adjacent domain. For example, the ABR 216 advertises the summary prefix 12.1.0.0/22 of the domain 202 to the domain 203 instead of advertising its three constituent IP subnets 12.1.0.0/24, 12.1.1.0/24, 12.1.2.0/24. Topology changes within the domains 201-204 are therefore not reflected or conveyed to other domains 201-204.

Routing tables are generated to determine the unicast routes through the network 200, e.g., using a shortest path calculation. The unicast routing table is then modified to support stateless IP multicasting for one or more multicast flows within the network 200. Some embodiments of the routing table include information indicating addresses of egress routers for the multicast flow associated with the routing table, next hop addresses for the addresses of the egress routers, indications of whether the egress routers are internal or external to the domain associated with the routing table, and information indicating one or more ABRs that connect the domain to other domains. One or more subsets of the addresses in the routing table that are external to the domain (i.e., egress routers that are in other domains) are associated with an address of the ABR that connects the domain to another domain. In some embodiments, the routing tables are generated or modified by the SDN controller 205, which includes one or more processors for performing the calculation, one or more memory elements to store data or the results of operations, and transmitters, receivers, or transceivers for receiving information from the routers 210-226 and providing information to the routers 210-226, such as information used to populate the routing tables.

Table 1 is a control plane routing table used in router 201 to support a multicast flow. The first column in table 1 indicates the address (e.g., IP prefix) of each of the egress routers of the multicast flow associated with the routing table. In the illustrated embodiment, the address is indicated by the reference numeral of the router in FIG. 2. The second column in Table 1 indicates the next hop from the router 210 to the egress router associated with the entry/row in the table. For example, the router 210 is the local router in the routing table. For another example, the next hop from the router 210 to the router 211 is the router 211. For yet another example, the next hop from the router 210 to the router 214 is via the router 211. The third column indicates whether the egress router for the entry is internal to the domain 201 that includes the router 210 or external to the domain 201. The fourth column indicates the advertising router for the corresponding egress router. For example, the advertising router for the egress router 213 is the egress router 213 because the egress router 213 is in the domain 201. For another example, the advertising router for the egress router 220 is the (advertising border) router 215 because the egress router 220 is in the domain 203, which is connected to the domain 201 by the ABR 215.

TABLE 1

| IP Prefix | Next Hop | Type | Advertising Router |
|---|---|---|---|
| 210 | Local | INT | 210 |
| 211 | 211 | INT | 211 |
| 212 | 212 | INT | 212 |
| 213 | 211 | INT | 213 |
| 214 | 211 | INT | 214 |
| 215 | 211 | INT | 215 |
| 216 | 211 | EXT | 215 |
| 217 | 211 | EXT | 215 |
| 218 | 211 | EXT | 215 |
| 219 | 211 | EXT | 215 |
| 220 | 211 | EXT | 215 |
| 221 | 211 | EXT | 215 |
| 222 | 211 | EXT | 215 |
| 223 | 211 | EXT | 215 |
| 224 | 211 | EXT | 215 |
| 225 | 211 | EXT | 215 |
| 226 | 211 | EXT | 215 |

In some embodiments, Table 1 is located in the control plane and is not used for forwarding IP packets in the data plane. Table 2 is a routing table in the data plane of the router 210. The data plane routing table can be used for routing packets in the multicast flow.

TABLE 2

| IP Prefix | Next Hop |
|---|---|
| 210 | Local |
| 211 | 211 |
| 212 | 212 |
| 213 | 211 |
| 214 | 211 |
| 215 | 211 |
| 216 | 211 |
| 217 | 211 |
| 218 | 211 |
| 219 | 211 |
| 220 | 211 |
| 221 | 211 |
| 222 | 211 |
| 223 | 211 |
| 224 | 211 |
| 225 | 211 |
| 226 | 211 |

Table 3 is a routing table used by the router 215, which is an ABR that interconnects the domain 201 and the domain 203. The first column in table 3 indicates the address (e.g., IP prefix) of each of the egress routers of the multicast flow associated with the routing table. In the illustrated embodiment, the address is indicated by the reference numeral of the router in FIG. 2. The second column in Table 3 indicates the next hop from the router 215 to the egress router associated with the entry/row in the table. For example, packets are forwarded from the router 215 to the router 210 via the next hop router 211. For another example, the next hop from the router 215 to the router 222 is the router 220. For yet another example, the next hop from the router 215 to the router 217 is via the (advertising border) router 216. As discussed herein, the router 215 is considered a member of both the domain 201 and the domain 203. Consequently, the third column indicates that the egress router for the entry is internal to either the domain 201 or the domain 203 or that the egress router is external to both the domain 201 and the domain 203. The fourth column indicates the advertising router for the corresponding egress router. For example, the advertising router for the egress router 210 is the egress router 210 because the egress router 210 is in the domain 201. For another example, the advertising router for the egress router 220 is the egress router 220 because the egress router 220 is in the domain 203. For yet another example, the advertising router for the egress router 217 is the (advertising border) router 216 because the egress router 217 is in the domain 202.

TABLE 3

| IP Prefix | Next Hop | Type | Advertising Router |
|---|---|---|---|
| 210 | 211 | INT | 210 |
| 211 | 211 | INT | 211 |
| 212 | 213 | INT | 212 |
| 213 | 213 | INT | 213 |
| 214 | 214 | INT | 214 |
| 215 | Local | INT | 215 |
| 216 | 220 | INT | 216 |
| 217 | 220 | EXT | 216 |
| 218 | 220 | EXT | 216 |
| 219 | 220 | EXT | 216 |
| 220 | 220 | INT | 220 |
| 221 | 220 | INT | 220 |
| 222 | 220 | INT | 220 |
| 223 | 220 | INT | 220 |
| 224 | 220 | INT | 220 |
| 225 | 220 | EXT | 220 |
| 226 | 220 | EXT | 220 |

Table 4 is a unicast routing table in the data plane of the router 215. The data plane routing table can be used for routing packets in the stateless IP multicast flow.

TABLE 4

| IP Prefix | Next Hop |
|---|---|
| 210 | 211 |
| 211 | 211 |
| 212 | 213 |
| 213 | 213 |
| 214 | 214 |
| 215 | Local |
| 216 | 220 |
| 217 | 220 |
| 218 | 220 |
| 219 | 220 |
| 220 | 220 |
| 221 | 220 |
| 222 | 220 |
| 223 | 220 |
| 224 | 220 |
| 225 | 220 |
| 226 | 220 |

If the routers 210-226 use data plane routing tables such as Table 2 for the router 210 or Table 4 for the router 215, the routers 210-226 are required to perform a table lookup for each address in an EMR of the EMR packets that are received by the corresponding routers 210-226. Thus, as discussed herein, the table lookup procedure is an O(N) procedure, where N is the number of routers in the network 200. Data plane routing tables that are derived from the unicast routing tables are modified to include information that allows multicast packets to be tunneled between ABRs such as the routers 215, 216, 224, or from ingress router to ABR, as discussed below.

Figure 3:
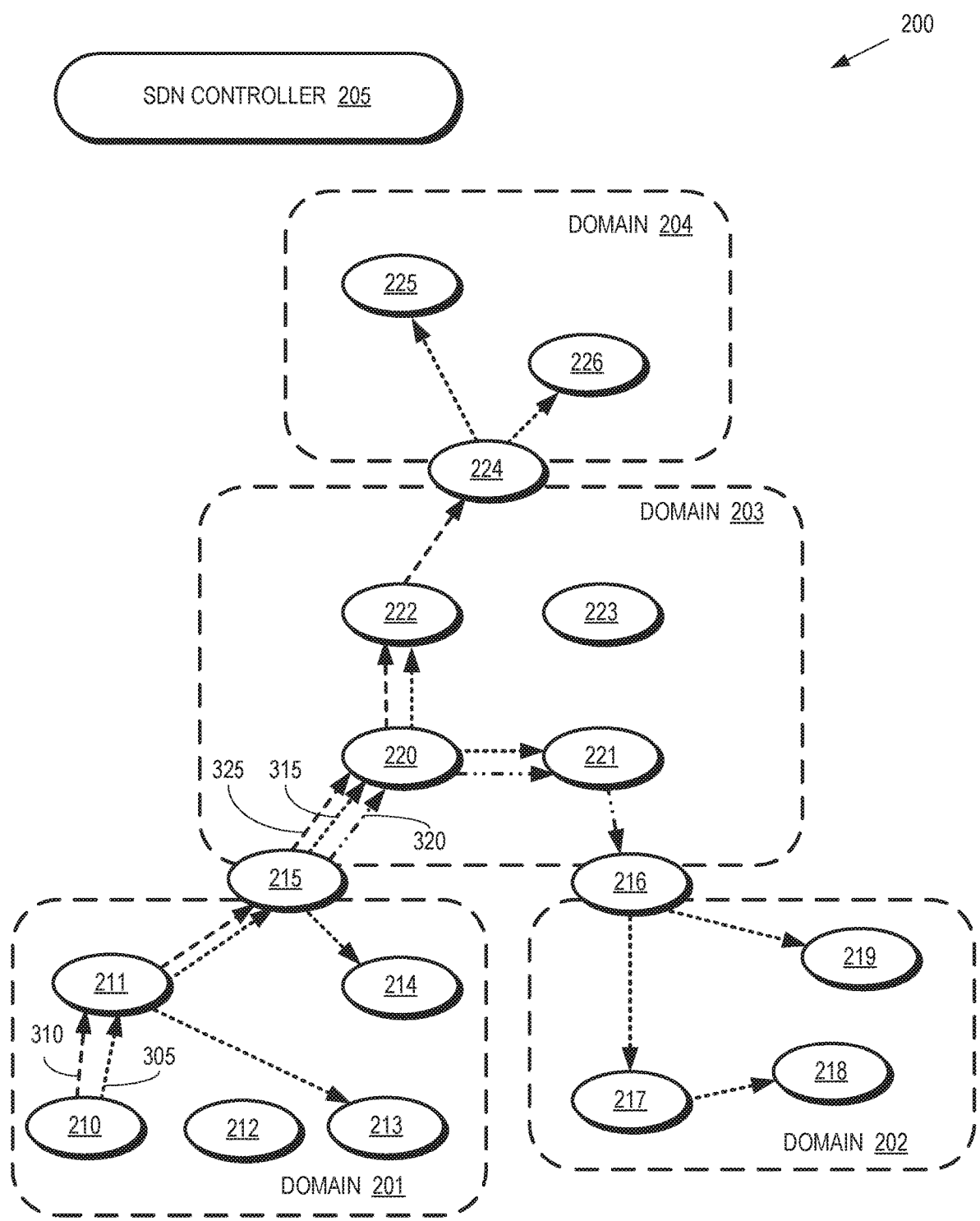
FIG. 3 is a block diagram of a network that uses modified data plane routing tables to support stateless IP multicasting with reduced numbers of table lookups according to some embodiments.

FIG. 3 is a block diagram of the network 200 that uses modified data plane routing tables to support stateless IP multicasting with reduced numbers of table lookups according to some embodiments. The network 200 corresponds to the network 200 shown in FIG. 2 and therefore includes domains 201-204, and SDN controller 205, and the routers 210-226. The routers 210-226 are interconnected according to previously established unicast routing information in the same manner as shown in FIG. 2. In the interest of clarity, the interconnections between the routers 210-226 that are established by the unicast routing information are not shown in FIG. 3 although they are the same as the interconnections shown in FIG. 2.

The data plane routing tables established according to the unicast routing information, such as Table 2 and Table 4, are modified to include additional information including information indicating whether the egress routers are internal or external to the domain that includes the router, an address of an advertising router (for internal egress routers) or an advertising border router (for external egress routers), and in some cases other information such as a type of tunnel that is used to reach an advertising border router.

Table 5 is a data plane routing table for the router 210 that is a modified version of Table 2. The first column in table 5 indicates the address (e.g., IP prefix) of each of the egress routers of the multicast flow associated with the routing table. In the illustrated embodiment, the address is indicated by the reference numeral of the router in FIG. 3. The second column in Table 5 indicates the next hop from the router 210 to the egress router associated with the entry/row in the table. The third column indicates whether the egress router for the entry is internal to the domain 201 that includes the router 210 or external to the domain 201. The fourth column indicates the advertising router for the corresponding egress router. Some embodiments of table 5 include that indicates a type of tunnel, which is used if the IP prefix is an address of a border router and indicates that a unicast tunneling method is to be used for EMR packets, as discussed herein.

TABLE 5

| IP Prefix | Next Hop | Type | Advertising Router | Tunnel Type |
|---|---|---|---|---|
| 210 | Local | INT | 210 | |
| 211 | 211 | INT | 211 | |
| 212 | 212 | INT | 212 | |
| 213 | 211 | INT | 213 | |
| 214 | 211 | INT | 214 | |
| 215 | 211 | INT | 215 | |
| 216 | 211 | EXT | 215 | |
| 217 | 211 | EXT | 215 | |
| 218 | 211 | EXT | 215 | |
| 219 | 211 | EXT | 215 | |
| 220 | 211 | EXT | 215 | |
| 221 | 211 | EXT | 215 | |
| 222 | 211 | EXT | 215 | |
| 223 | 211 | EXT | 215 | |
| 224 | 211 | EXT | 215 | |
| 225 | 211 | EXT | 215 | |
| 226 | 211 | EXT | 215 | |

Table 6 is a data plane routing table for the (advertising border) router 215 that is a modified version of Table 4.

TABLE 6

| IP Prefix | Next Hop | Type | Advertising Router | Tunnel Type |
|---|---|---|---|---|
| 210 | 211 | INT | 210 | |
| 211 | 211 | INT | 211 | |
| 212 | 213 | INT | 212 | |
| 213 | 213 | INT | 213 | |
| 214 | 214 | INT | 214 | |
| 215 | Local | INT | 215 | |
| 216 | 220 | INT | 216 | |
| 217 | 220 | EXT | 216 | |
| 218 | 220 | EXT | 216 | |
| 219 | 220 | EXT | 216 | |
| 220 | 220 | INT | 220 | |
| 221 | 220 | INT | 220 | |
| 222 | 220 | INT | 220 | |
| 223 | 220 | INT | 220 | |
| 224 | 220 | INT | 220 | |
| 225 | 220 | EXT | 220 | |
| 226 | 220 | EXT | 220 | |

The ingress router 210 receives a multicast packet that is a part of a multicast flow. The ingress router 210 generates multiple copies of the packet based on information in the routing table illustrated in Table 5. The multiple copies include a single copy of an intra-domain packet that is forwarded to routers in the domain 201 that includes the ingress router 210. In the illustrated embodiment, Table 5 indicates that the routers 211, 213, 214 in the domain 201 are egress routers that have subscribed to the multicast flow. An EMR header is generated for the copy of the packet that is multicast to the domain 201. The EMR header includes information indicating the IP addresses of the routers 211, 213, 214. The EMR header is prepended to the copy of the packet and the resulting EMR packet is multicast using a stateless IP multicast, as indicated by the dotted arrow 305. Intermediate or transit routers (such as the router 211 and the router 215 when operating as a transit router) perform a linear lookup of each IP address in the EMR packet from the routing table and perform any necessary replication, as indicated by the other dotted arrows (not indicated by reference numerals in the interest of clarity).

The multiple copies generated by the ingress router 210 also include an inter-domain packet that is used to convey the multicast packet to any routers that are outside of the domain 201 via the (ABR) router 215. The IP addresses of any egress routers that are connected to the ingress router 210 via the router 215 are included in an EMR header, which is prepended to the copy of the packet to form an EMR packet. The EMR packet is then unicast from the ingress router 210 to the router 215. In some embodiments, a tunnel header including the address of the router 215 is used to encapsulate the EMR packet so that the encapsulated EMR packet is unicast via a tunnel between the ingress router 210 and the router 215, as indicated by the dashed arrow 310. Thus, intermediate or transit routers between the ingress router 210 and the router 215 perform unicast forwarding based on the tunnel encapsulation, which eliminates the linear lookup of IP addresses in the EMR packet by the intermediate or transit routers.

In response to receiving the unicast EMR packet, the router 215 de-encapsulates the EMR packet by removing the tunneling header. The router 215 generates an internal copy and external copies of the de-encapsulated packet (or the payload of the packet) based on the addresses included in the EMR header in the routing table shown in Table 6. An EMR header is generated for the internal copy using the IP addresses of the egress routers 221, 222 in the domain 203. A first EMR header is generated for an external copy using the addresses of the egress routers 217-219 in the domain 202 and a first EMR packet is generated for the corresponding (ABR) router 216 by prepending the first EMR header to the first external copy. A second EMR header is generated for a second external copy using the addresses of the egress routers 225, 226 in the domain 204. A second EMR packet is generated for the corresponding (ABR) router 224 by prepending the second EMR header to the second external copy.

The router 215 multicasts the internal copy to the egress routers 221, 222, as indicated by the dotted arrow 315. The router 215 unicasts the first EMR packet to the (ABR) router 216, e.g., by encapsulating and tunneling the first EMR packet including the first EMR header, as indicated by the dash-dot arrow 320. The router 215 unicasts the second EMR packet to the (ABR) router 224, e.g., by encapsulating and tunneling the second EMR packet including the second EMR header, as indicated by the dashed arrow 325. The process of receiving EMR packets, partitioning EMR packets based on internal/external addresses included in the EMR header, and unicasting/multicasting copies of the packets is repeated at the routers that receive the unicast or multicast packets. In some embodiments, egress routers generate local copies of the packet for transmission to LAN that are attached to the egress router.

Figure 4:
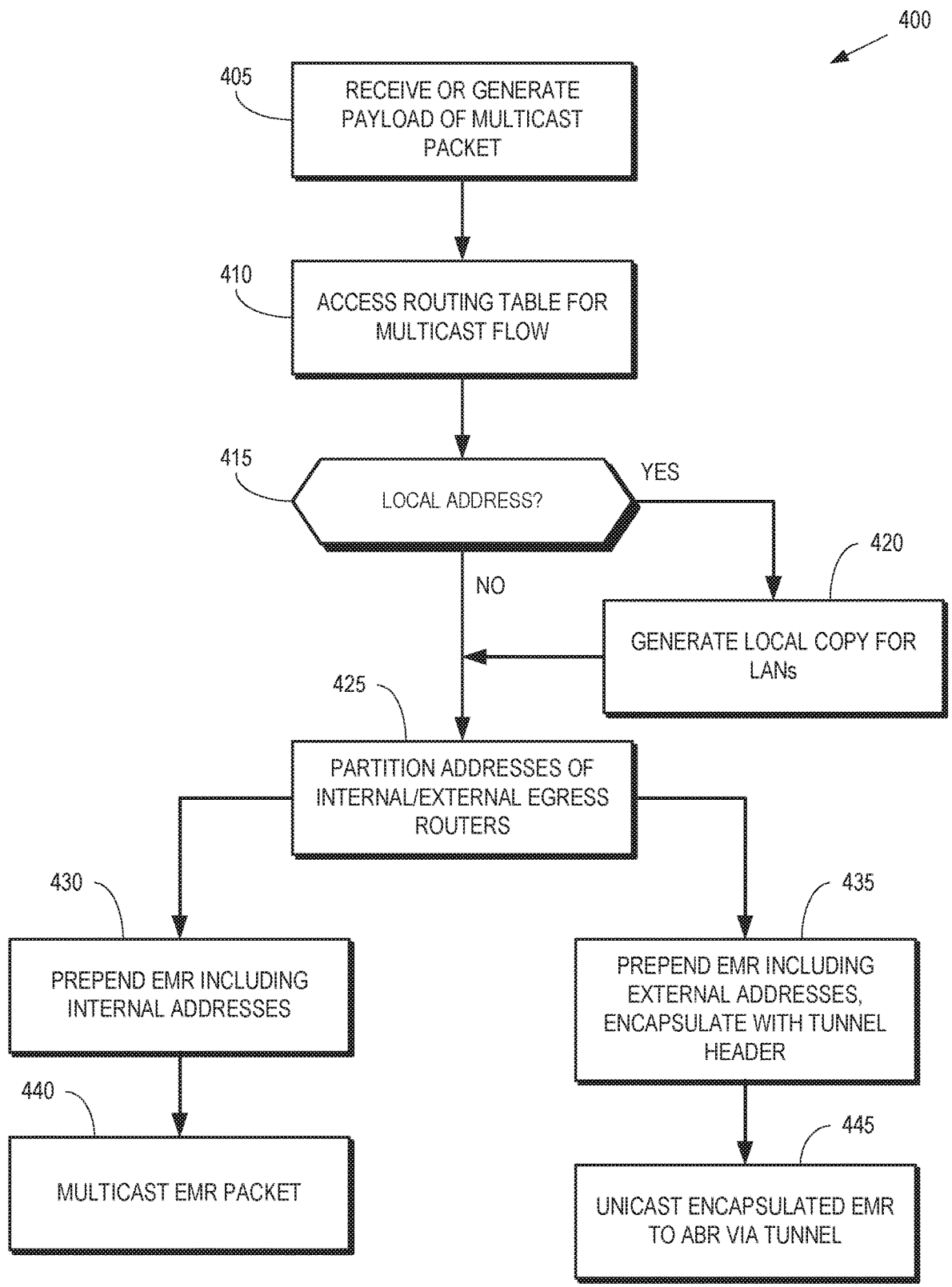
FIG. 4 is a flow diagram of a method of partitioning addresses of egress routers for a multicast flow and generating copies of the packets for internal and external egress routers according to some embodiments.

FIG. 4 is a flow diagram of a method 400 of partitioning addresses of egress routers for a multicast flow and generating copies of the packets for internal and external egress routers according to some embodiments. The method 400 is implemented in some embodiments of the communication system 100 shown in FIG. 1 and the network 200 shown in FIG. 2. The method is implemented in an ingress router or an advertising border router (ABR).

At block 405, the router receives (in the case of an ABR) or generates (in the case of an ingress router) a payload of a multicast packet associated with a multicast flow. For example, an ABR de-encapsulates a tunneled unicast packet that includes an EMR packet formed of an EMR header and a payload. For example, an ingress router is provided with a list of addresses of egress routers and a payload.

At block 410, the router accesses a routing table for the multicast flow. Examples of routing tables stored in routers include the routing tables illustrated in Tables 5 and 6. Accessing the routing table includes accessing information in entries corresponding to addresses of egress routers that are indicated in the EMR header of an EMR packet or addresses of the egress routers for the multicast flow provided to an ingress router.

At decision block 415, for each address of an egress router, the router determines whether the address is a local address indicating that the router is an egress router for the multicast flow. If so, the method 400 flows to block 420 and the local router generates a local copy that is transmitted to the LANs associated with the router. The method 400 then flows to block 425. If the router is not an egress router for the multicast flow, the method 400 flows directly to block 425.

At block 425, the router partitions the addresses of the egress routers into internal egress routers that are in the same domain as the router and external egress routers that are in other domains. One branch of the method 400 flows to block 430 to perform processing on the internal addresses and another branch of the method 400 flows to block 435 to perform processing on the external addresses.

At block 430, the router generates an EMR that includes information indicating addresses of the internal egress routers. The router prepends the EMR header to the payload to generate an EMR packet for multicasting to the internal egress routers. The method 400 then flows to block 440 and the router multicasts the EMR packet to the internal egress routers.

At block 435 the router generates an EMR that includes information indicating addresses of the external egress routers. The router prepends the EMR header to the payload to generate an EMR packet and then encapsulates the EMR packet, e.g., by prepending a tunnel header to the EMR packet. The method 400 flows to block 445 and the router unicast the encapsulated EMR packet to one or ABR associated with other domains. Unicasting the encapsulated EMR packet includes transmitting the encapsulated EMR packet via one or more tunnels to the one or ABR.

Figure 5:
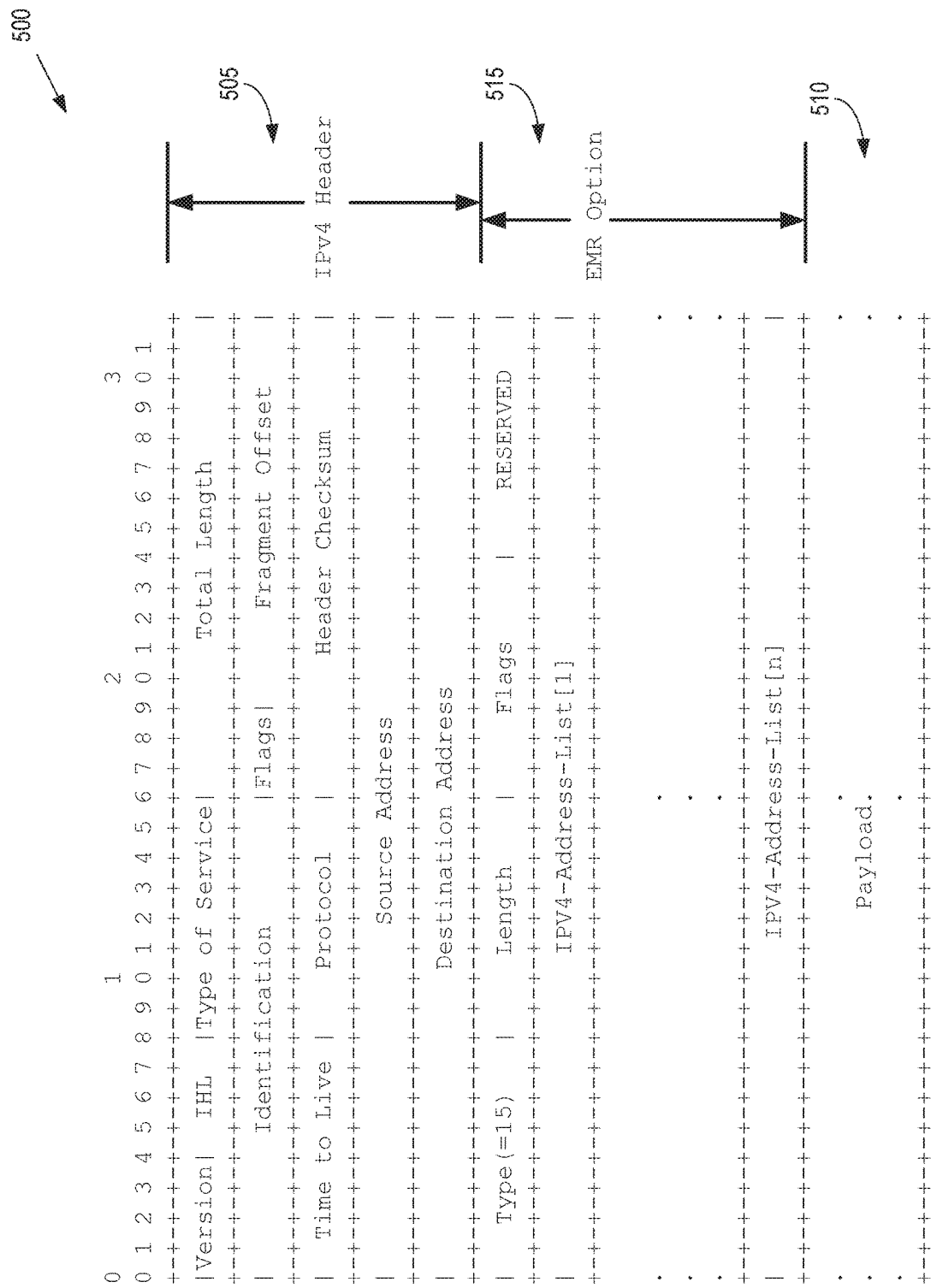
FIG. 5 illustrates encoding of an explicit multicast route (EMR) packet using IPv4 with an IPv4 option after the IPv4 header according to some embodiments.

FIG. 5 illustrates encoding of an EMR packet 500 using IPv4 according to some embodiments. The EMR packet 500 includes a conventional IPv4 header 505 that includes fields such as a source address, a destination address, a header checksum, and the like. The EMR packet 500 also includes a payload 510 and an EMR header 515 as an IPv4 Option. The EMR header as IPv4 Option 515 includes fields indicating a type of the IPv4 Option as EMR, a length of the header, one or more flags, reserved bits, and a list including IPv4 addresses of the egress routers for the multicast flow that includes the EMR packet 500.

Figure 6:
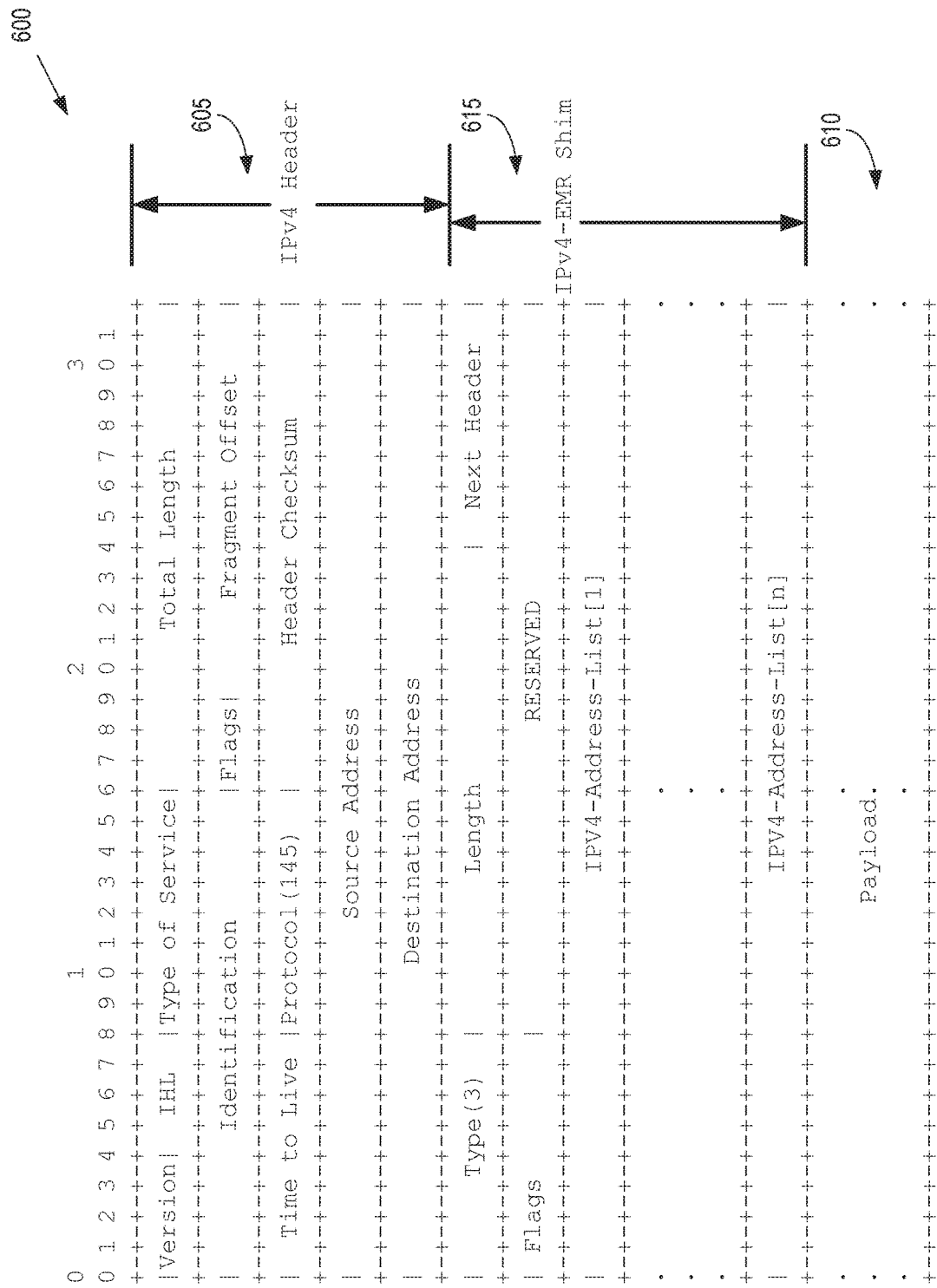
FIG. 6 illustrates encoding of an EMR packet using IPv4 with a shim header according to some embodiments.

FIG. 6 illustrates encoding of an EMR packet 600 using IPv4 with a shim header according to some embodiments. The EMR packet 600 includes a conventional IPv4 header 605 that includes fields such as a source address, a destination address, a header checksum, and the like. The EMR packet 600 also includes a payload 610 and an EMR shim header 615. The EMR shim header 615 sits between the IPv4 layer and the transport layer in the protocol stack. Presence of the EMR shim header 615 is indicated by encoding a protocol field in the IPv4 header 605. The EMR shim header 610 includes fields indicating a type of the header, a length of the header, one or more flags, reserved bits, and a list including IPv4 addresses of the egress routers for the multicast flow that includes the EMR packet 600. In some embodiments a type field is encoded with a value 3 to indicate the type of the EMR shim header 610 as IPV4-EMR.

Figure 7:
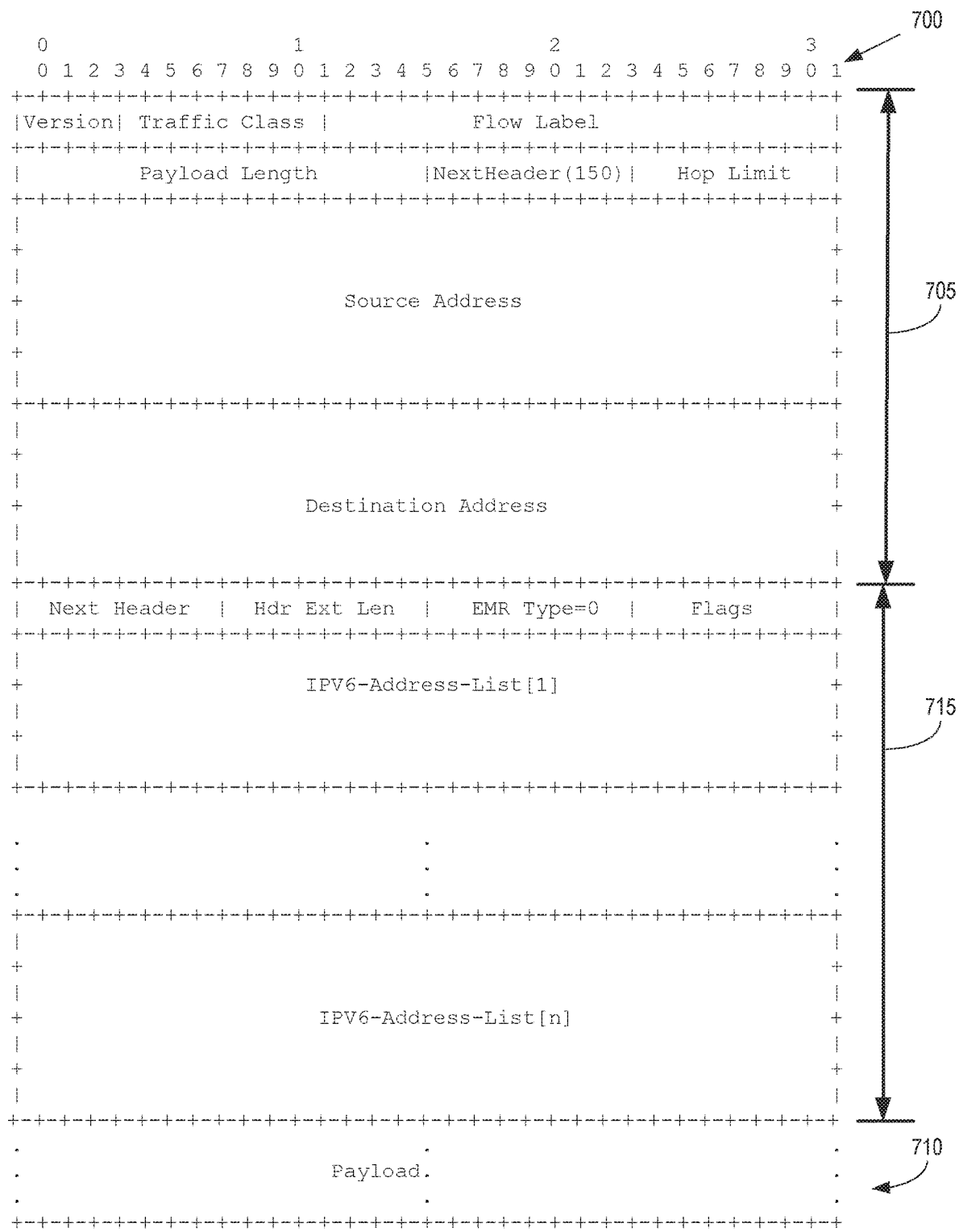
FIG. 7 illustrates encoding of an EMR packet using IPv6 with an extension header to the IPv6 header according to some embodiments.

FIG. 7 illustrates encoding of an EMR packet 700 using IPv6 with an extension header to the IPv6 header according to some embodiments. The EMR packet 700 includes a conventional IPv6 header 705 that includes fields such as a source address, a destination address, a traffic class, flow label, payload length, next header, hop limit, and the like. The EMR packet 700 also includes a payload 710 and an IPv6 extension header 715. The EMR header encoded as an IPv6 extension header 715 includes fields indicating a next header, a header extension length, an EMR type, other flags, and a list including IPv6 addresses of the egress routers for the multicast flow that includes the EMR packet 700. In some embodiments, the next header field is set to 150, which indicates that the next header is the IPv6 EMR extension header and the next header field in the IPv6 extension header 715 is set to indicate the transport protocol type, e.g., TCP, UDP, and the like.

Figure 8:
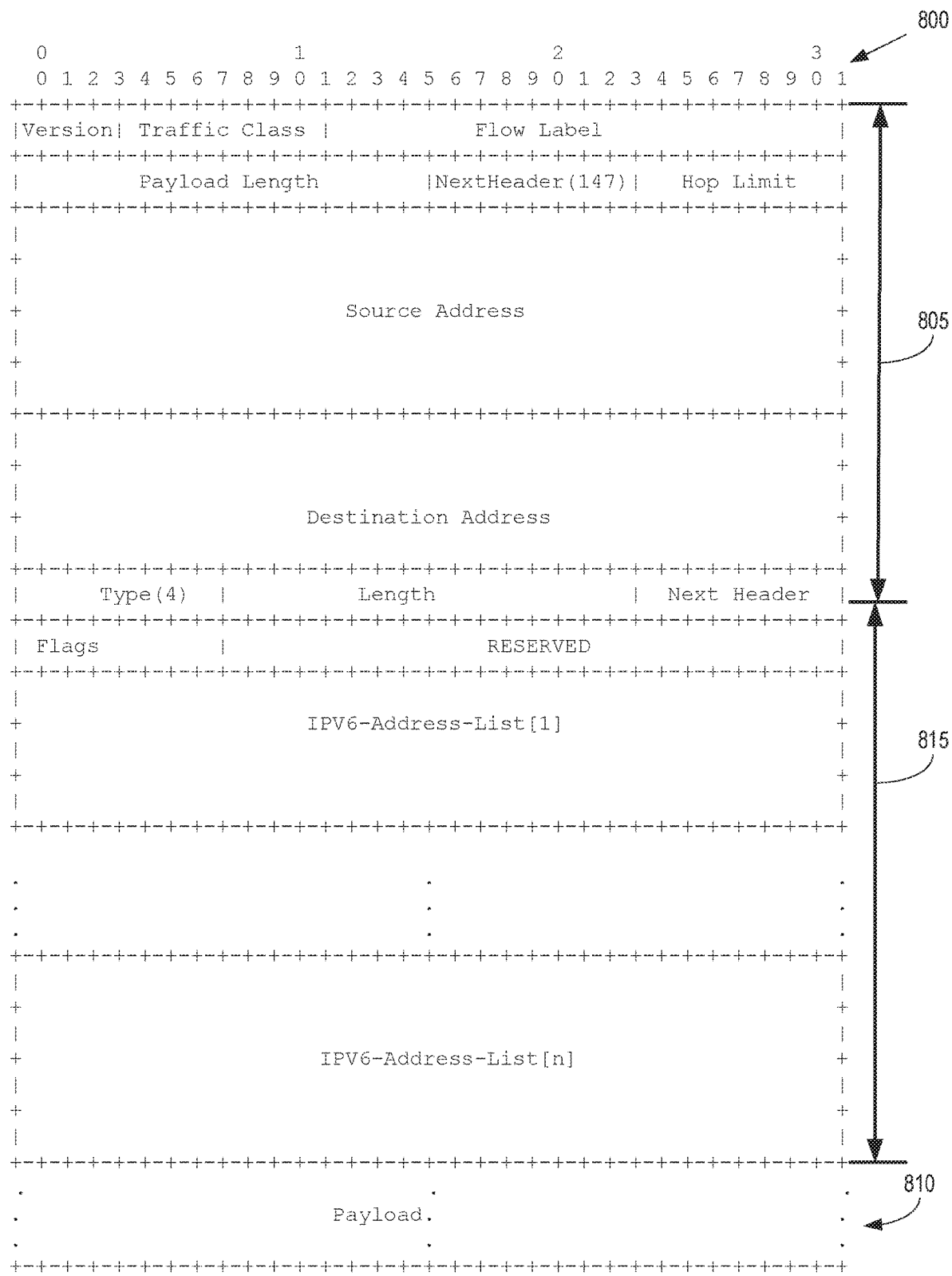
FIG. 8 illustrates encoding of an EMR packet using IPv6 with a shim header according to some embodiments.

FIG. 8 illustrates encoding of an EMR packet 800 using IPv6 with a shim header according to some embodiments. The EMR packet 800 includes a conventional IPv6 header 805 that includes fields such as a source address, a destination address, a traffic class, flow label, payload length, next header, hop limit, and the like. The EMR packet 800 also includes a payload 810 and an EMR shim header 815. The EMR shim header 815 sits between the IPv6 layer and the transport layer in the protocol stack. Presence of the EMR shim header 815 is indicated by encoding a protocol field in the IPv6 header 805. The EMR shim header 810 includes fields indicating a type of the header, a length of the header, one or more flags, reserved bits, and a list including IPv6 addresses of the egress routers for the multicast flow that includes the EMR packet 800. In some embodiments a type field is encoded with a value 4 to indicate the type of the EMR shim header 810 as IPV6-EMR.

Figure 9:
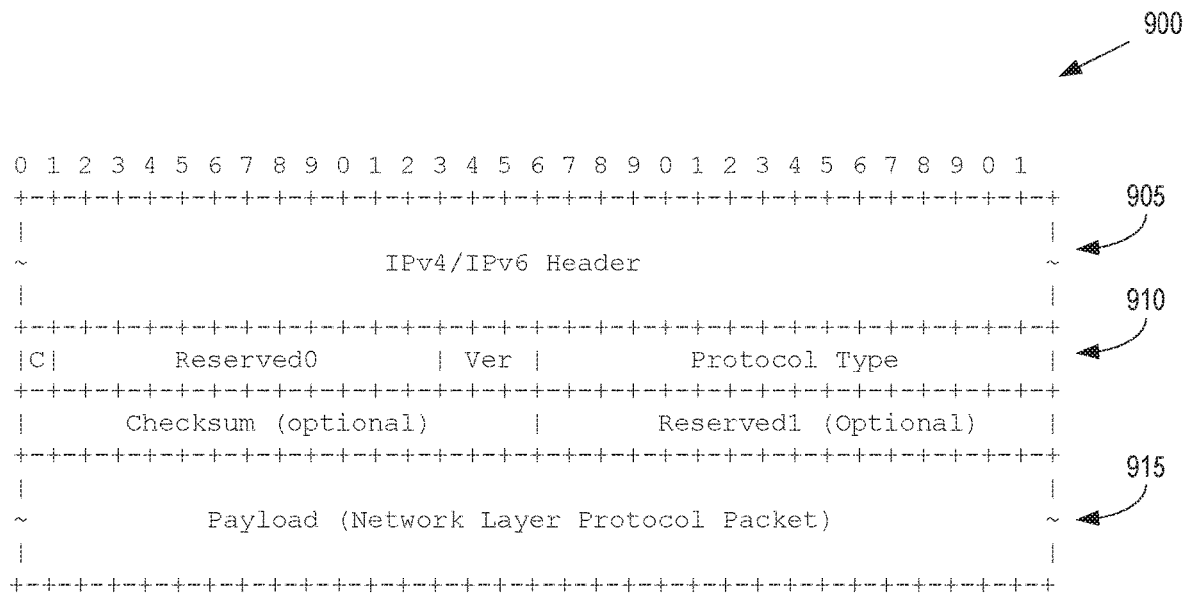
FIG. 9 illustrates encoding of a Generic Tunneling Encapsulation (GRE) packet for a network layer packet according to some embodiments.

FIG. 9 illustrates encoding of a Generic Routing Encapsulation (GRE) packet 900 for a network layer packet according to some embodiments. The standardized GRE format is used to encapsulate network or a link layer protocol packet types to be tunneled over an IP network. The GRE packet 900 is encapsulated with an IPv4 or IPv6 header 905 that includes a source address field that is set to an IP address at the source router of the tunnel and a destination address that indicates an IP address at a destination router of the tunnel. The GRE packet 900 also includes a GRE header 910 following the IP header 905. The GRE header 910 includes information indicating a version, a protocol type, a checksum, and the like. The protocol type indicates the type of the protocol packet that is being tunneled. In the illustrated embodiment, the payload 915 is a network layer protocol packet.

Figure 10:
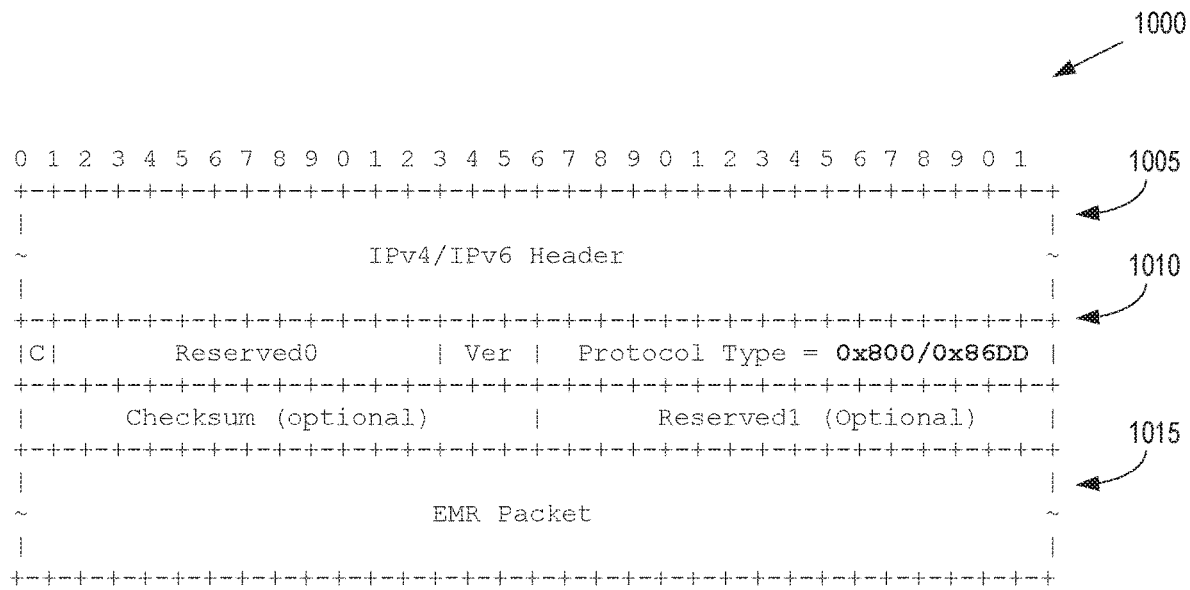
FIG. 10 illustrates encoding of a GRE packet for an EMR packet according to some embodiments.

FIG. 10 illustrates encoding of a GRE packet 1000 for unicast tunneling of an EMR packet according to some embodiments. The GRE packet 1000 is encapsulated with an IPv4 or IPv6 header 1005 that includes a source address field that is set to an IP address at the source router of the tunnel and a destination address that indicates an IP address at a destination router of the tunnel. The GRE packet 1000 also includes a GRE header 1010 following the IPv4 or IPv6 header 1005. The GRE header 1010 includes information indicating a version, a protocol type, a checksum, and the like. The protocol type indicates the type of the protocol packet that is being tunneled. In the illustrated embodiment, the payload 1015 is an EMR packet and, consequently, the destination address in the IPv4 or IPv6 header 1005 is an IP address of an ABR.

Figure 11:
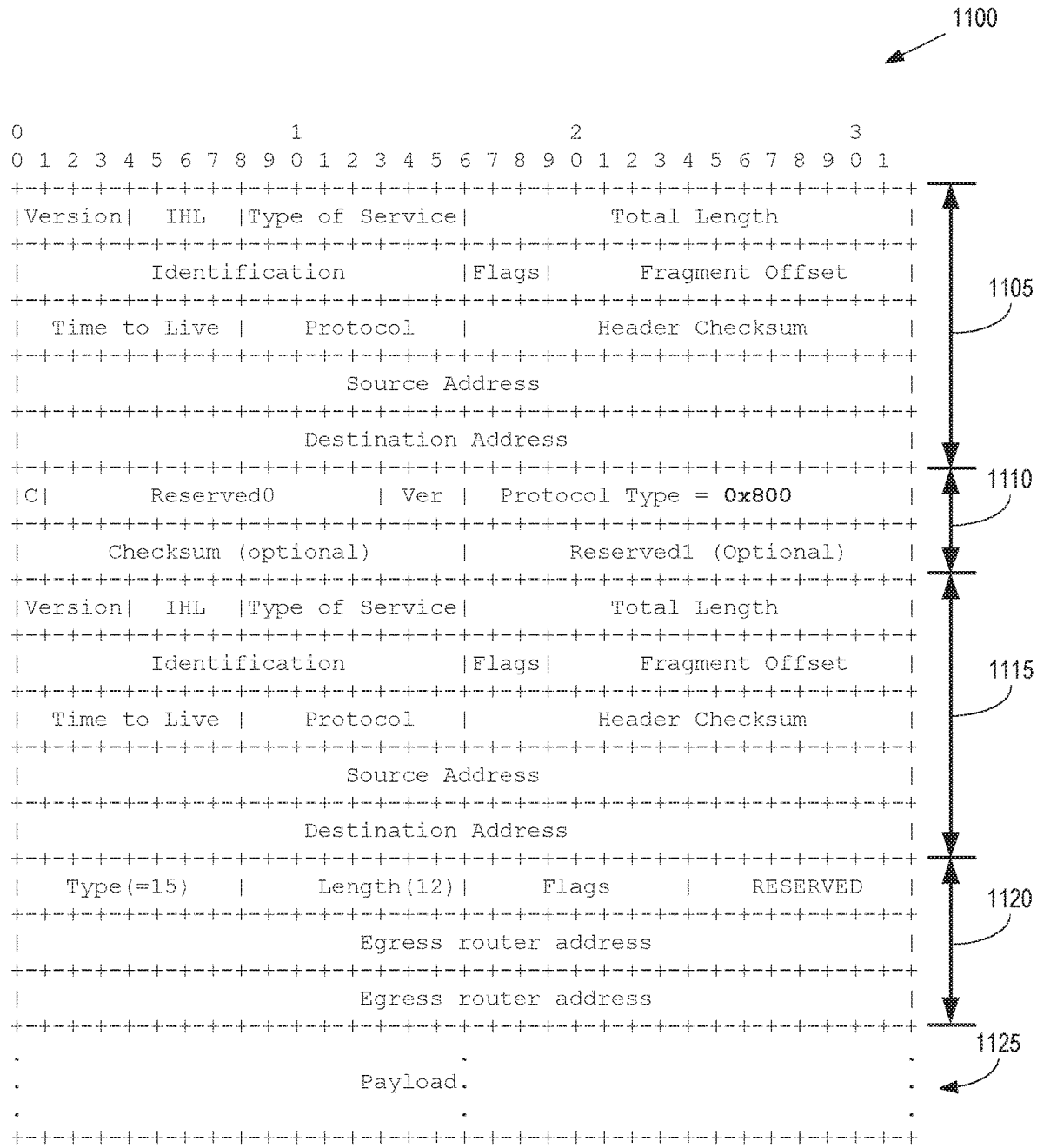
FIG. 11 illustrates an EMR packet using IPv4 with an IPv4 option after the IPv4 header that is encapsulated for tunneling between an ingress router and an advertising border router (ABR) or between two ABRs according to some embodiments.

FIG. 11 illustrates an EMR packet 1100 that is encapsulated for tunneling between an ingress router and an ABR or between two ABRs using GRE according to some embodiments. The first seven lines of the EMR packet 1100 include fields that are used for tunnel encapsulation of the EMR packet 1100 and the remainder of the lines represent the EMR packet 1100. The tunnel encapsulation fields include an IPv4 header 1105 and a GRE header 1110. The IPv4 header 1105 includes fields indicating addresses of the source and destination endpoints of the tunnel. For example, the IPv4 header 1105 can include addresses of the router 215 and the router 224 to tunnel the EMR packet 1100 across the subnet 203 shown in FIGS. 2 and 3. The fields of the EMR packet 1100 include another IPv4 header 1115, and EMR 1120 (shown here as IPv4 Option) including addresses of the egress routers that receive the EMR packet 1100, and a payload 1125. The fields of the IPv4 header 1115 include a source address of the ingress router of the multicast flow such as address of router 201 in FIGS. 2 and 3 and a destination address that is the address of the next hop that would process this EMR packet such as the destination endpoint of the tunnel. For example, the IPv4 header 1115 can include address of router 224 as the destination address when the EMR packet 1110 is tunneled across subnet 203 shown in FIGS. 2 and 3. The remaining part of the tunneled EMR packet 1100 after the first seven lines can also be encoded in other formats described in FIGS. 6-8.

Figure 12:
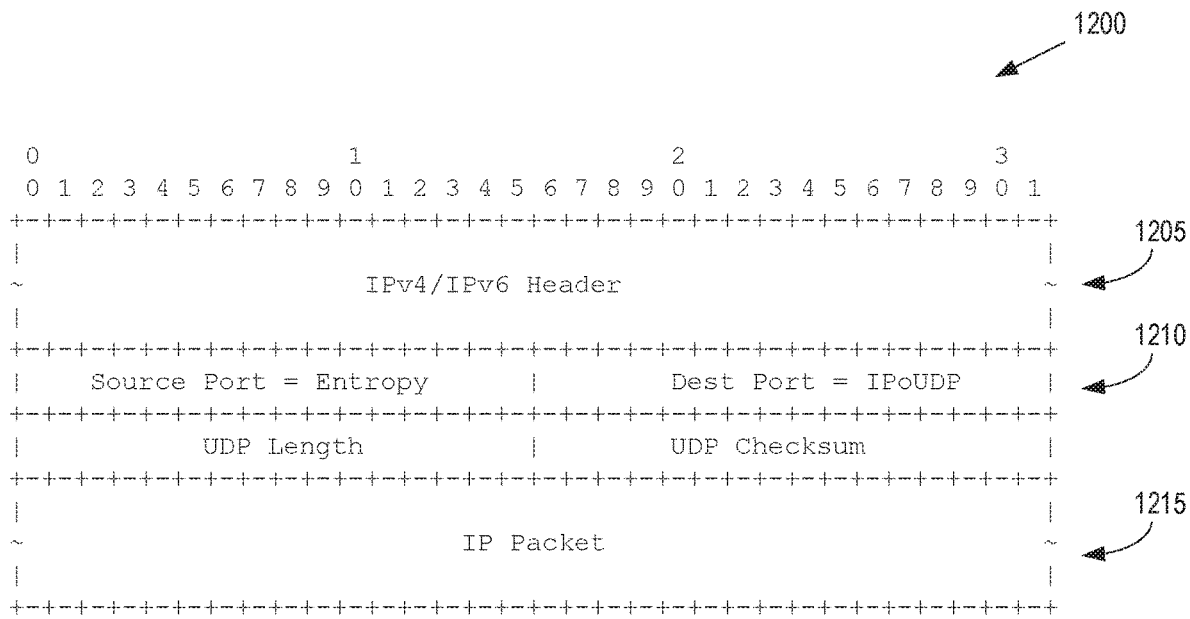
FIG. 12 illustrates a format for IP in user datagram protocol (IP-in-UDP) encapsulation according to some embodiments.

FIG. 12 illustrates a format 1200 for IP in user datagram protocol (UDP) tunneling encapsulation according to some embodiments. Some network deployments perform load-balancing of IP packets over equal cost multipath (ECMP) based on a layer 4 header such as a transmission control protocol (TCP) or UDP, so IP-in-UDP encapsulation provides better load balancing for tunneled packets. The format 1200 for IP-in-UDP encapsulation includes an IPv4 or IPv6 header 1205, an UDP encapsulation header 1210, and an IP packet 1215. The IPv4 or IPv6 header 1205 includes a source address field that is set to an IP address at the source router of the tunnel and a destination address that indicates an IP address at a destination router of the tunnel. The UDP encapsulation header 1210 includes a source port field including a 16-bit entropy value that is generated by the encapsulated to uniquely identify a flow and a destination port field that includes a port number that indicates an IP packet as the payload of the UDP.

Figure 13:
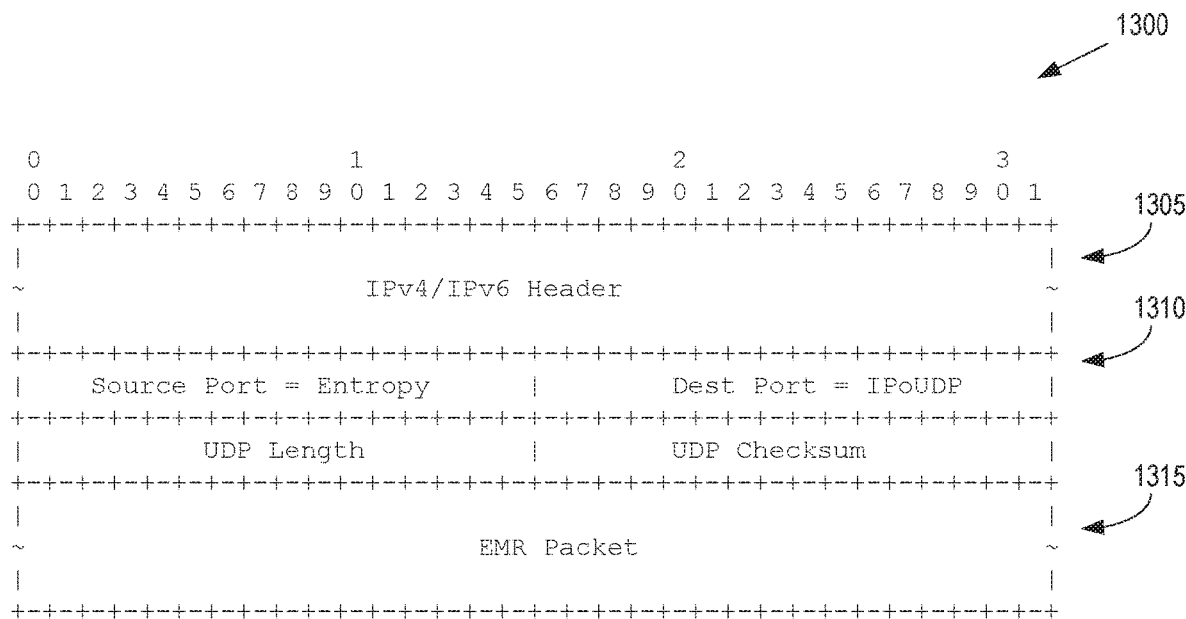
FIG. 13 illustrates a format for IP-in-UDP encapsulation of an EMR packet according to some embodiments.

FIG. 13 illustrates a format 1300 for IP-in-UDP encapsulation for unicast tunneling of an EMR packet according to some embodiments. The format 1300 for IP-in-UDP encapsulation includes an IPv4 or IPv6 header 1305, an UDP encapsulation header 1310, and an EMR packet 1315. The UDP encapsulation header 1310 that includes a source port field including a 16-bit entropy value that is generated by the encapsulated to uniquely identify a flow and a destination port field that includes a port number that indicates an IP packet as the payload of the UDP.

Figure 14:
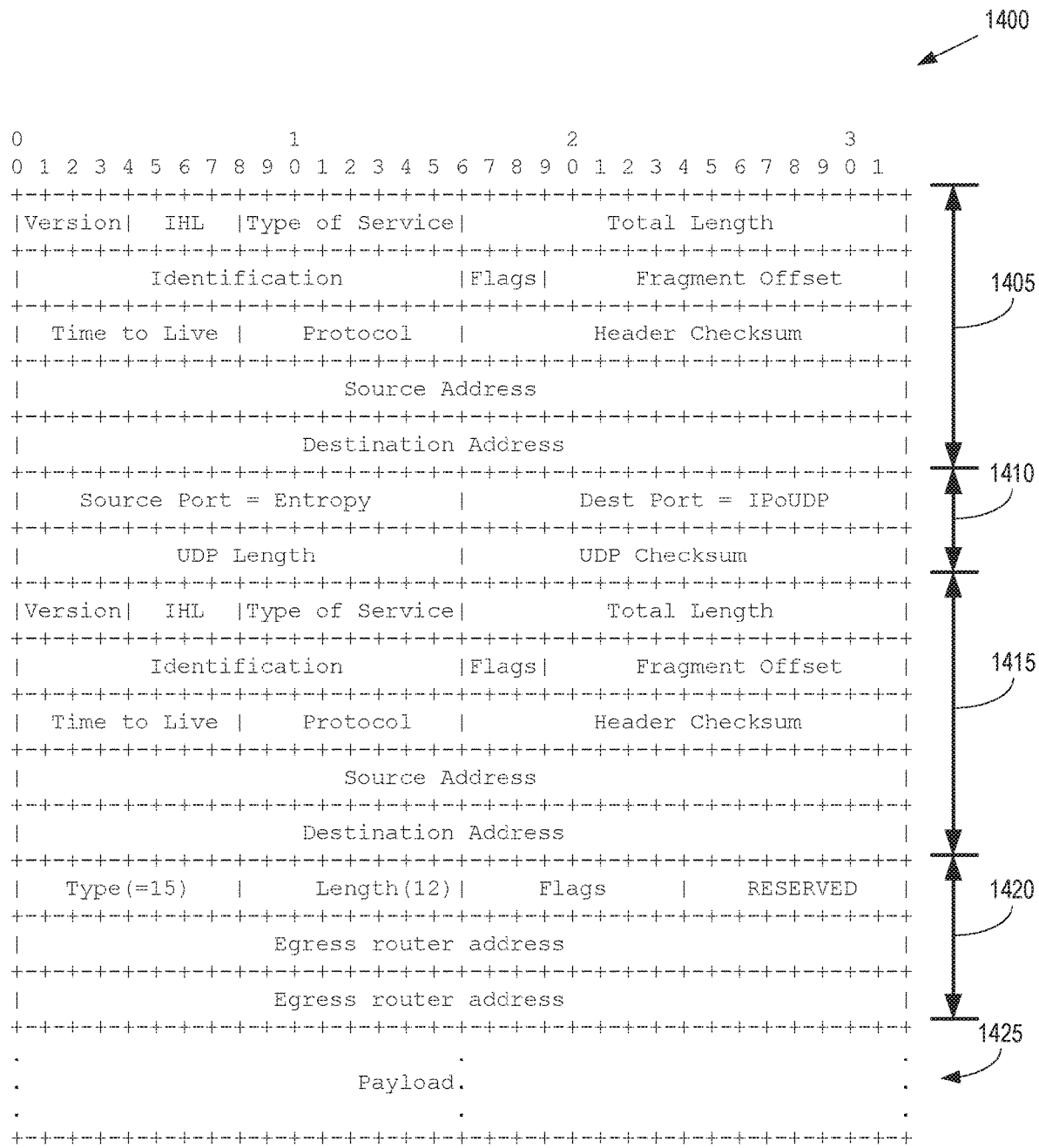
FIG. 14 illustrates an EMR packet using IPV4 with an IPv4 option after the IPv4 header that is encapsulated for tunneling between an ingress router and an ABR or between two ABRs using IP-in-UDP according to some embodiments.

FIG. 14 illustrates an EMR packet 1400 that is encapsulated for tunneling between an ingress router and an ABR or between two ABRs using IP-in-UDP according to some embodiments. The first seven lines of the EMR packet 1400 include fields that are used for tunnel encapsulation of the EMR packet 1400 and the remainder of the lines represent the EMR packet 1400. The tunnel encapsulation fields include an IPv4 header 1405 and a UDP header 1410. The IPv4 header 1405 includes fields indicating addresses of the source and destination endpoints of the tunnel. For example, the IPv4 header 1405 can include addresses of the router 215 and the router 216 to tunnel the EMR packet 1400 across the subnet 203 shown in FIGS. 2 and 3. The fields of the EMR packet 1400 include another IPv4 header 1415, an EMR 1420 (shown here as IPv4 Option) including addresses of the egress routers that receive the EMR packet 1400, and a payload 1425. The fields of the IPv4 header 1415 include a source address of the ingress router of the multicast flow such as address of router 201 in FIGS. 2 and 3 and a destination address that is the address of the next hop that would process this EMR packet such as the destination endpoint of the tunnel. For example, the IPv4 header 1415 can include address of router 224 as the destination address when the EMR packet 1400 is tunneled across subnet 203 shown in FIGS. 2 and 3. The remaining part of the tunneled EMR packet 1400 after the first seven lines can also be encoded in other formats described in FIGS. 6-8.

Figure 15:
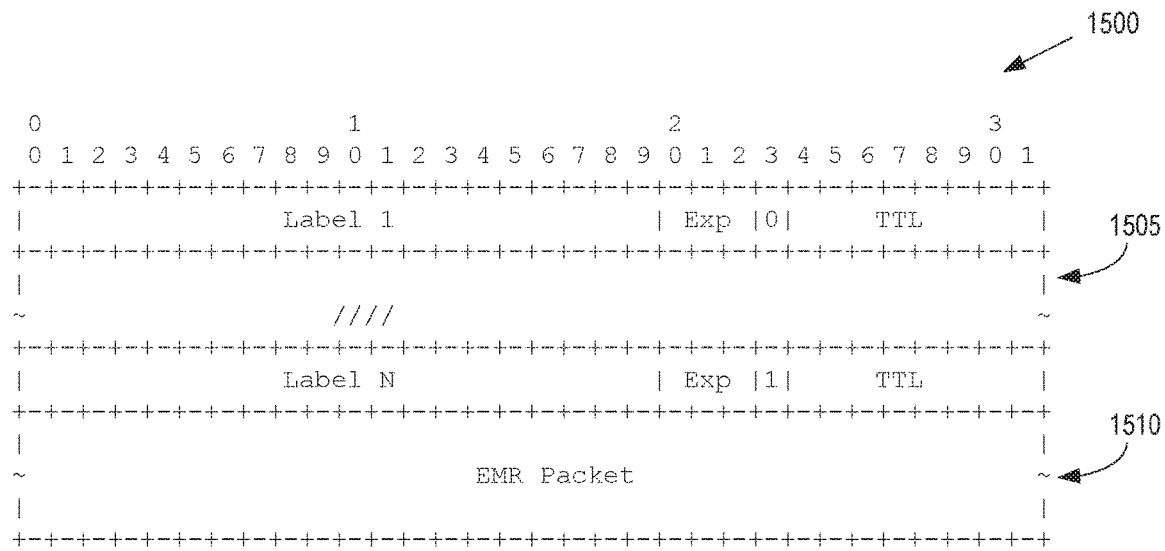
FIG. 15 illustrates a format for multi-protocol label switching (MPLS) encapsulation of an EMR packet according to some embodiments.

FIG. 15 illustrates a format 1500 for multi-protocol label switching (MPLS) as a network delivery protocol for unicast tunneling of an EMR packet according to some embodiments. The format 1500 includes a set 1505 of labels and corresponding time to live (TTL) fields. The format 1500 also includes the EMR packet 1510. The source router of the MPLS tunnel chooses an appropriate MPLS LSP for transporting the EMR packet 1510. Techniques for choosing the MPLS LSP are known in the art.

Figure 16:
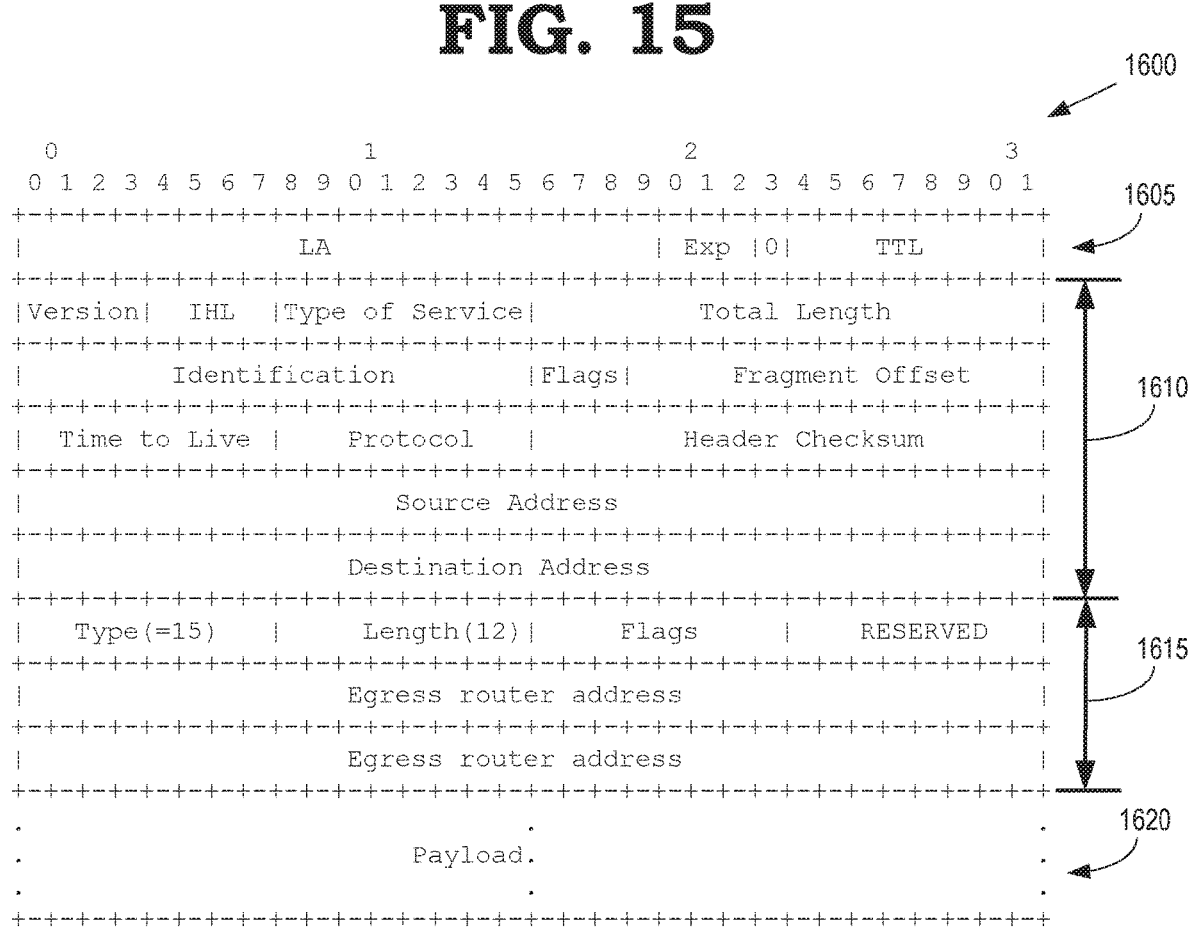
FIG. 16 illustrates an encapsulated packet that includes an EMR packet using IPv4 with an IPv4 option after the IPv4 header encapsulated for tunneling according to MPLS according to some embodiments.

FIG. 16 illustrates an encapsulated packet 1600 that includes an EMR packet encapsulated for tunneling according to MPLS according to some embodiments. The packet 1600 includes a set 1605 of labels and corresponding TTL fields, an IPv4 header 1610, and EMR 1615 (shown here is IPv4 Option), and a payload 1620. The EMR packet can also be encoded in other formats described in FIGS. 6-8

Figure 17:
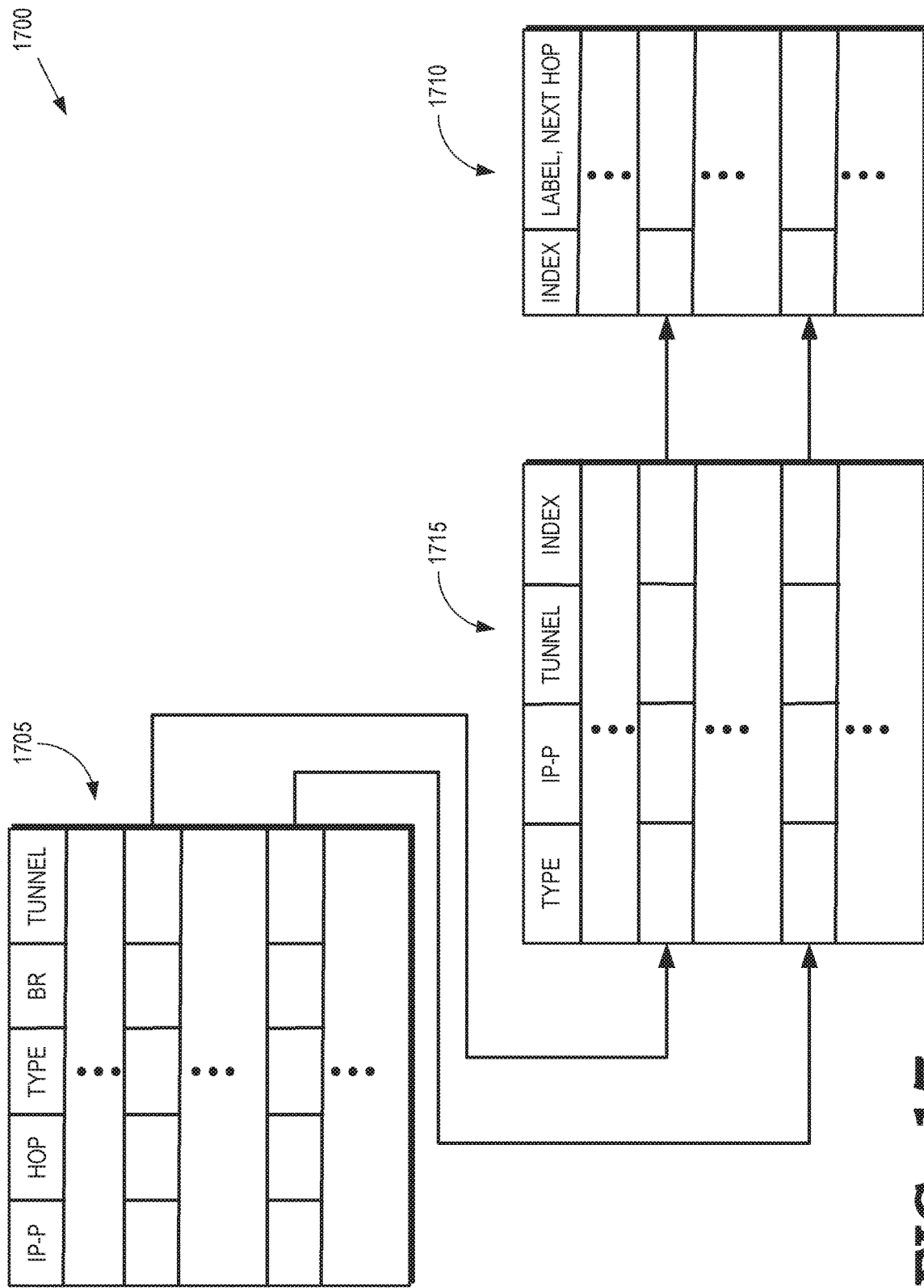
FIG. 17 is a block diagram of a data plane implemented in a router for tunneling EMR packets according to some embodiments.

FIG. 17 is a block diagram of a data plane 1700 implemented in a router for tunneling EMR packets according to some embodiments. In some embodiments, MPLS based tunneling is used to tunnel traffic to ABR using an IGP shortcut installed on the IP route entry to the ABR. The IGP shortcut uses an MPLS-TE LSP installed as the next hop of an IP route. Some embodiments of the IGP perform an SPF computation to determine entries in the IP routing tables described herein. The IGP then performs a second computation considering MPLS-TE LSPs as logical interfaces and assigning a cost/metric to the logical interface. The egress router for each MPLS-TE LSP is considered than a list of destinations whose shortest path traverses the egress router (as established during the first computation) are considered. These destinations are given the egress router of the MPLS-TE LSP as a next hop. If the cost of the MPLS-TE LSP is less than the cost of the shortest path to the egress router than the MPLS-TE LSP is considered as the better next hop. The destinations are then installed into the routing table with the MPLS-TE LSP as the next hop, which is termed the IGP shortcut. If the routing table entry for the ABR is installed with IGP shortcut then all packets to the ABR are tunneled over the shortcut. However, tunneling EMR packets over the IGP shortcut includes an additional criterion that the IGP shortcut must terminate at the ABR and not at an intermediate router.

The data plane 1700 includes a routing table 1705 installed in a router. The routing table 1705 includes entries having values of fields including an IP prefix, a next hop, a type (internal/external), a border router, and a tunnel type that indicates a type of a tunnel such as none to indicate that a tunnel does not exist for this entry, LDP to indicate that an LDP tunnel is available, BGP to indicate that a BGP tunnel is available, and the like. The data plane also includes a next hop label forwarding entry (NHFLE) table 1710 and a forwarding equivalence class (FEC) to NHLFE (FTN) table 1715. Entries that include tunnels are linked to the FTN table 1715, which includes entries for different tunnel types. Each entry in the FTN table 1715 includes a field indicating a type (such as LDP, BGP or MPLS-TE etc), an IP prefix indicating the destination of the tunnel, a tunnel identifier, and an index into the NHLFE table 1710, which includes entries having an index field and a field that identifies a label in the next hop for the tunnel.

Some embodiments of an ingress router of a multicast flow originates an EMR packet using the following algorithm/pseudocode to partition packets into internal EMR and external EMR packets.

```
EMR_Multicast(Payload, List_of_Egress_Routers[ ])
{
    // Initialize the list where each entry is tuple of <Next-hop,
    // AddressList>, i.e Lists of intra-domain IP Addresses for to each
    // next-hop. AddressList is of type <numAddresses, Address[ ]>
    List of <NextHop, AddressList> NextHopAddressList[ ] = 0
    // Initialize the list where each entry is tuple of <BR,
    AddressList[ ]>, i.e
```

```
// lists of inter-domain IP Addresses for to each BR.
List_of_<BR, AddressList[ ]> BR_AddressList[ ] = 0
for each Address in List_of_Egress_Routers[ ]
{
   // Lookup egress router's loopback address in IP Route Table.
   RouteEntry Route = Route_Table[Address];
   // If the route type is INT then lookup the next-hop in
   // NextHopAddressList[ ], else lookup BR in
   BR_AddressList[ ]. If the
   // next-hop/BR does not exist in respective list then create and
   add one
   // into the list.
   if (Route->Type == INT)
   {
      <NextHop, AddressList> NextHopEntry =
         NextHopAddressList[ Route->NextHop];
      if NextHopEntry not found
      {
         NextHopEntry = new <Route->NextHop, AddressList = empty>;
         NextHopAddressList[ Route->NextHop] = NextHopEntry;
      }
      // Push the address of the egress router to AddressList of
      the Next-
      // Hop.
      NextHopEntry->AddressList->Address[NextHopEntry-
      >AddressList->numAddresses] = Address;
      NextHopEntry->AddressList->numAddresses =
      NextHopEntry->AddressList->numAddresses + 1;
   }
   else
   {
      <BR, AddressList> BR_Entry = BR_AddressList[Route->BR];
      if NextHopEntry not found
      {
         BR_Entry = new <Route->BR, AddressList = empty>;
         BR_AddressList[Route->BR] = BR_Entry;
      }
      // Push the address of the egress router to AddressList of
      the BR.
      BR_Entry->AddressList->Address[NextHopEntry->AddressList-
      >numAddresses] = Address;
      BR_Entry->AddressList->numAddresses =
      NextHopEntry->AddressList->numAddresses + 1;
   }
}
// Build a EMR-I packet for each next-hop in NextHopAddressList[ ],
push EMR
// onto copy and forward the copy to next-hop.
for each <NextHop, AddressList>in NextHopAddressList[ ]
{
   // Create copy of the packet and push the EMR + IP Header. Note
   that
   // AddressList is encoded into EMR in reverse order (last entry
   is the first
   // address in EMR).
   PacketCopy =
   IP Header(DestAddr = NextHop) + EMR(AddressList) +
   Copy(Payload);
   // Forward the EMR packet to next-hop.
   PacketSend(PacketCopy, NextHop);
}
// Build a EMR-E packet for each BR in BR_AddressList[ ], push EMR
// onto copy and forward the copy to next-hop.
for each <BR, AddressList> in BR_AddressList[ ]
{
   // Create copy of the packet and push the EMR + IP Header. Note
   that
   // AddressList is encoded into EMR in reverse order (last entry
   is the first
   // address in EMR).
   PacketCopy = IP_Header(DestAddr = BR) + EMR(AddressList) +
   Copy(Payload);
   // Lookup BR in IP Route Table.
   RouteEntry BR_Route = Route_Table[BR];
   // If the next-hop is IGP shortcut and shortcut LSP terminates at
   BR, then
   // use this as tunnel.
   if (BR_Route->NextHop->IsIGPShortcut and
      BR Route->NextHop->IGPShortcutLSP->DestAddr
      = BR)
   {
      // Lookup the IGP shortcut LSP in FTN Table.
      FTN_Entry =
         FTN_Table [RSVP-TE, BR, BR_Route->NextHop->
         IGPShortcutLSP->tunnelID];
      // Get the NHLFE entry for Label stack, NextHop
      NHLFE_Entry = NHLFE_Table[FTN Entry->NHLFE_index];
      AddLabelStack(PacketCopy, NHLFE_Entry->Label[ ]);
      NextHop = NHLFE_Entry->NextHop;
   }
   else if (BR_Route->BR_Tunnel-Type == LDP or BGP or SR)
   {
      // Lookup the LSP in FTN Table by Type and BR.
      FTN_Entry =
         FTN_Table[BR_Route->BR_Tunnel_Type, BR, 0];
      // Get the NHLFE entry for Label stack, NextHop
      NHLFE_Entry = NHLFE_Table[FTN_Entry->NHLFE_index];
      AddLabelStack(PacketCopy, NHLFE_Entry->Label[ ]);
      NextHop = NHLFE_Entry->NextHop;
   }
   else if (BR_Route->BR_Tunnel_Type == RSVP-TE or SR-TE)
   {
      // Use some sort of hashing on address list to get the
      // tunnelID.
      tunnelID = Hash(AddressList->Address[ ]) % ...
      // Lookup the LSP in FTN Table by Type and BR.
      FTN_Entry =
         FTN_Table[BR_Route->BR_Tunnel_Type, BR, tunnelID];
      // Get the NHLFE entry for Label stack, NextHop
      NHLFE_Entry = NHLFE_Table[FTN_Entry->NHLFE_index];
      AddLabelStack(PacketCopy, NHLFE Entry->Label[ ]);
      NextHop = NHLFE Entry->NextHop;
   }
   else if (BR_Route->BR_Tunnel_Type == GRE)
   {
      Add_GRE_Encap(PacketCopy, GRE_Protocol as IPV4 or IPv6);
      Add_IP_Header(SrcAddr = This_Router->LoopBackAddress,
      DestAddr = BR);
      NextHop = BR_Route->NextHop;
   }
   else if (BR_Route->BR_Tunnel_Type == IP-in-UDP)
   {
      Add_UDP_Encap(PacketCopy, Src_Port = entropy, Dest_Port =
      UDP_Port_IP);
      Add_IP_Header(SrcAddr = This_Router->LoopBackAddress,
      DestAddr = BR);
      NextHop = BR_Route->NextHop;
   }
   // Forward the EMR packet to next-hop.
   PacketSend(PacketCopy, NextHop);
}
```

Some embodiments of a router that receives a packet in a multicast flow performs the following algorithm.

```
EMR Process (EMR_Packet)
{
   Payload = EMR Packet->Payload;
   List_of_Egress_Routers = EMR_Packet->EMR->Address[ ];
   EMR_Multicast(Payload, List_of_Egress_Routers[ ]);
}
```

Figure 18:
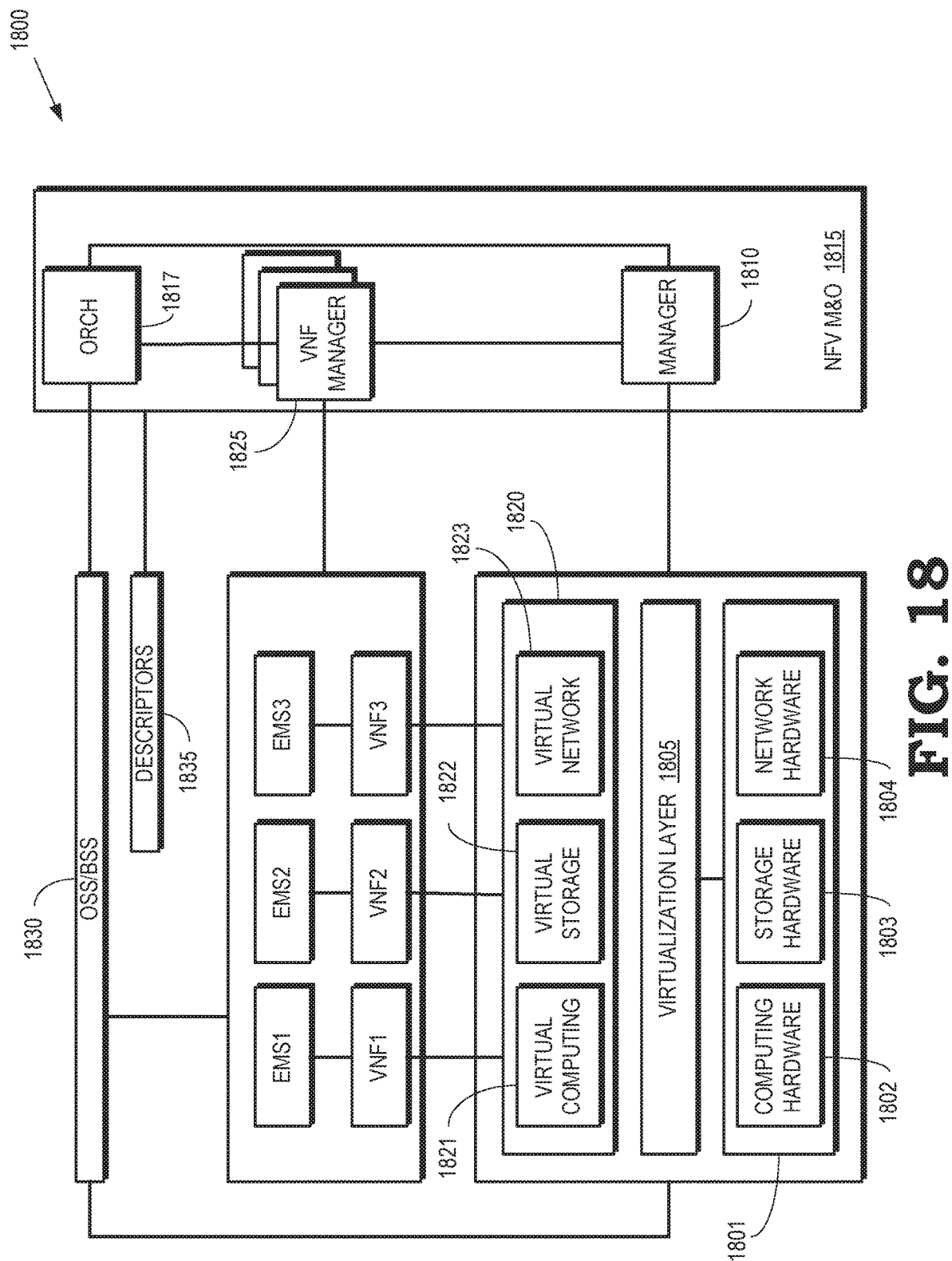
FIG. 18 is a block diagram of a network function virtualization (NFV) architecture according to some embodiments.

FIG. 18 is a block diagram of an NFV architecture 1800 according to some embodiments. The NFV architecture 1800 is used to implement some embodiments of the communication system 100 shown in FIG. 1 and the network 200 shown in FIG. 2. The NFV architecture 1800 includes hardware resources 1801 including computing hardware 1802, storage hardware 1803, and network hardware 1804. The computing hardware 1802 is implemented using one or more processors, the storage hardware 1803 is implemented using one or more memories, and the network hardware 1804 is implemented using one or more transceivers, transmitters, receivers, interfaces, and the like.

A virtualization layer 1805 provides an abstract representation of the hardware resources 1801. The abstract representation supported by the virtualization layer 1805 can be managed using a virtualized infrastructure manager 1810, which is part of the NFV management and orchestration (M&O) module 1815. Some embodiments of the manager 1810 are configured to collect and forward performance measurements and events that may occur in the NFV architecture 1800. For example, performance measurements may be forwarded to an orchestrator (ORCH) 1817 implemented in the NFV M&O 1815. The hardware resources 1801 and the virtualization layer 1805 may be used to implement virtual resources 1820 including virtual computing resources 1821, virtual storage resources 1822, and virtual networking resources 1823.

Virtual networking functions (VNF1, VNF2, VNF3) run over the NFV infrastructure (e.g., the hardware resources 1801) and utilize the virtual resources 1820. For example, the virtual networking functions (VNF1, VNF2, VNF3) may be implemented using virtual machines supported by the virtual computing resources 1821, virtual memory supported by the virtual storage resources 1822, or virtual networks supported by the virtual network resources 1823. Element management systems (EMS1, EMS2, EMS3) are responsible for managing the virtual networking functions (VNF1, VNF2, VNF3). For example, the element management systems (EMS1, EMS2, EMS3) may be responsible for fault and performance management. In some embodiments, each of the virtual networking functions (VNF1, VNF2, VNF3) is controlled by a corresponding VNF manager 1825 that exchanges information and coordinates actions with the manager 1810 or the orchestrator 1817.

The NFV architecture 1800 may include an operation support system (OSS)/business support system (BSS) 1830. The OSS/BSS 1830 deals with network management including fault management using the OSS functionality. The OSS/BSS 1830 also deals with customer and product management using the BSS functionality. Some embodiments of the NFV architecture 1800 use a set of descriptors 1835 for storing descriptions of services, virtual network functions, or infrastructure supported by the NFV architecture 1800. Information in the descriptors 1835 may be updated or modified by the NFV M&O 1815.

The NFV architecture 1800 implements network slices that provide control plane functions or user plane functions. A network slice is a complete logical network that provides communication services and network capabilities, which can vary from slice to slice. User equipment can concurrently access multiple slices that support multiple service flows between a core network and the user equipment. Some embodiments of user equipment provide Network Slice Selection Assistance Information (NSSAI) parameters to the network to assist in selection of a slice instance for the user equipment. A single NSSAI may lead to the selection of several slices. The NFV architecture 1800 can also use device capabilities, subscription information and local operator policies to do the selection. An NSSAI is a collection of smaller components, Single-NSSAIs (S-NSSAI), which each include a Slice Service Type (SST) and possibly a Slice Differentiator (SD). Slice service type refers to an expected network behavior in terms of features and services (e.g., specialized for broadband or massive IoT), while the slice differentiator can help selecting among several network slice instances of the same type, e.g. to isolate traffic related to different services into different slices.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

As used herein, the term "circuitry" may refer to one or more or all of the following:
 a) hardware-only circuit implementations (such as implementations and only analog and/or digital circuitry) and
 b) combinations of hardware circuits and software, such as (as applicable):
  i. a combination of analog and/or digital hardware circuit(s) with software/firmware and
  ii. any portions of a hardware processor(s) with software (including digital signal processor(s), software, and memory(ies) that work together to cause an apparatus, such as a mobile phone or server, to perform various functions) and
 c) hardware circuit(s) and/or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in a server, a cellular network device, or other computing or network device.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A router configured for deployment in a first domain of a network, the router comprising:
   a processor configured to:
      access addresses of egress routers for a multicast flow that are partitioned into local addresses of egress routers in the first domain and external addresses of egress routers in a second domain of the network, and
      prepend an explicit multicast route (EMR) to a packet in the multicast flow to form a first EMR packet, wherein the EMR includes information representing the external addresses;
   a transmitter configured to unicast the first EMR packet to an advertising border router (ABR) that conveys the multicast flow from the first domain to the second domain, and
   a memory configured to store a routing table including information indicating addresses of the egress routers, next hop addresses for the addresses, indications of whether the egress routers are internal or external to the first domain, and information indicating the ABR.

2. The router of claim 1, wherein the processor is configured to determine whether the router is an egress router for the multicast flow, and wherein the transmitter is configured to transmit at least one local copy of the packet to at least one local area network (LAN) in response to determining that the router is an egress router for the multicast flow.

3. The router of claim 1, wherein the processor is configured to encapsulate the first EMR packet in a tunnel header, and wherein the transmitter is configured to unicast the encapsulated first EMR packet by tunneling the encapsulated first EMR packet to the ABR.

4. The router of claim 1, wherein a subset of the addresses in the routing table that are external to the first domain are associated with an address of the ABR.

5. The router of claim 1, wherein the routing table is configured based on previously determined unicast routing information.

6. The router of claim 1, wherein the processor is configured to modify the routing table in response to changes in topology of the network.

7. A router configured for deployment in a first domain of a network, the router comprising:
   a processor configured to:
      access addresses of egress routers for a multicast flow that are partitioned into local addresses of egress routers in the first domain and external addresses of egress routers in a second domain of the network, and
      prepend an explicit multicast route (EMR) to a packet in the multicast flow to form a first EMR packet, wherein the EMR includes information representing the external addresses; and
   a transmitter configured to unicast the first EMR packet to an advertising border router (ABR) that conveys the multicast flow from the first domain to the second domain;
   wherein the processor is configured to determine next hop addresses for the local addresses, generate copies of the packet for the next hop addresses, and generate second EMR packets for the copies by prepending EMRs that include information indicating the local addresses associated with each next hop address to the copies of the packet.

8. The router of claim 7, wherein the transmitter is configured to multicast the second EMR packets towards the egress routers in the first domain.

9. A method comprising:
   accessing, at a first router in a first domain of a network, addresses of egress routers for a multicast flow that are partitioned into local addresses of egress routers in the first domain and external addresses of egress routers in a second domain of the network;
   prepending an explicit multicast route (EMR) to a packet in the multicast flow to form a first EMR packet, wherein the EMR includes information representing the external addresses;
   unicasting the first EMR packet to an advertising border router (ABR) that conveys the multicast flow from the first domain to the second domain, and
   storing a routing table including information indicating addresses of the egress routers, next hop addresses for the addresses, indications of whether the egress routers are internal or external to the first domain, and information indicating the ABR.

10. The method of claim 9, further comprising:
    transmitting at least one local copy of the packet to at least one local area network (LAN) in response to the first router being an egress router for the multicast flow.

11. The method of claim 9, further comprising:
    encapsulating the first EMR packet in a tunnel header, and wherein unicasting the encapsulated first EMR packet comprises tunneling the encapsulated first EMR packet to the ABR.

12. The method of claim 9, wherein a subset of the addresses in the routing table that are external to the first domain are associated with an address of the ABR.

13. The method of claim 9, further comprising:
configuring the routing table based on previously determined unicast routing information.

14. The method of claim 9, further comprising:
modifying the routing table in response to changes in topology of the network.

15. A method comprising:
accessing, at a first router in a first domain of a network, addresses of egress routers for a multicast flow that are partitioned into local addresses of egress routers in the first domain and external addresses of egress routers in a second domain of the network;
prepending an explicit multicast route (EMR) to a packet in the multicast flow to form a first EMR packet, wherein the EMR includes information representing the external addresses;
unicasting the first EMR packet to an advertising border router (ABR) that conveys the multicast flow from the first domain to the second domain; and
determining next hop addresses for the local addresses, generating copies of the packet for the next hop addresses, and generating second EMR packets for the copies by prepending EMRs that include information indicating the local addresses associated with each next hop address to the copies of the packet.

16. The method of claim 15, further comprising:
multicasting the second EMR packets towards the egress routers in the first domain.

17. An apparatus comprising:
at least one processor; and
at least one memory including computer program code;
the at least one memory and the computer program code configured to, with the at least one processor, cause the apparatus at least to perform:
accessing addresses of egress routers for a multicast flow that are partitioned into local addresses of egress routers in a first domain of a network and external addresses of egress routers in a second domain of the network;
prepending an explicit multicast route (EMR) to a packet in the multicast flow to form an EMR packet, wherein the EMR includes information representing the external addresses;
unicasting the EMR packet to an advertising border router (ABR) that conveys the multicast flow from the first domain to the second domain; and
storing a routing table including information indicating addresses of the egress routers, next hop addresses for the addresses, indications of whether the egress routers are internal or external to the first domain, and information indicating the ABR.

18. The apparatus of claim 17, wherein the at least one memory and the computer program code configured to, with the at least one processor, cause the apparatus at least to perform:
determining whether the router is an egress router for the multicast flow; and
transmitting at least one local copy of the packet to at least one local area network (LAN) in response to determining that the router is an egress router for the multicast flow.

19. The apparatus of claim 17, wherein the at least one memory and the computer program code configured to, with the at least one processor, cause the apparatus at least to perform:
encapsulating the first EMR packet in a tunnel header; and
unicasting the encapsulated first EMR packet by tunneling the encapsulated first EMR packet to the ABR.

20. The apparatus of claim 17, wherein a subset of the addresses in the routing table that are external to the first domain are associated with an address of the ABR.

21. The apparatus of claim 17, wherein the routing table is configured based on previously determined unicast routing information.

22. The apparatus of claim 17, wherein the at least one memory and the computer program code configured to, with the at least one processor, cause the apparatus at least to perform:
modifying the routing table in response to changes in topology of the network.

23. An apparatus comprising:
at least one processor; and
at least one memory including computer program code;
the at least one memory and the computer program code configured to, with the at least one processor, cause the apparatus at least to perform:
accessing addresses of egress routers for a multicast flow that are partitioned into local addresses of egress routers in a first domain of a network and external addresses of egress routers in a second domain of the network;
prepending an explicit multicast route (EMR) to a packet in the multicast flow to form an EMR packet, wherein the EMR includes information representing the external addresses;
unicasting the EMR packet to an advertising border router (ABR) that conveys the multicast flow from the first domain to the second domain; and
determining next hop addresses for the local addresses, generating copies of the packet for the next hop addresses, and generating second EMR packets for the copies by prepending EMRs that include information indicating the local addresses associated with each next hop address to the copies of the packet.

24. The apparatus of claim 23, wherein the at least one memory and the computer program code configured to, with the at least one processor, cause the apparatus at least to perform:
multicasting the second EMR packets towards the egress routers in the first domain.

* * * * *